(12) United States Patent
Aikawa et al.

(10) Patent No.: US 7,008,344 B2
(45) Date of Patent: *Mar. 7, 2006

(54) CONTROL APPARATUS FOR CONTROLLING A SHIFT OPERATION IN AN AUTOMATIC TRANSMISSION

(75) Inventors: Akira Aikawa, Aichi-ken (JP); Hiroaki Kato, Toyota (JP); Katsutoshi Sato, Toyoake (JP); Yasuo Shirai, Chiryu (JP); Atsumi Ohara, Ibaraki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/628,449

(22) Filed: Jul. 29, 2003

(65) Prior Publication Data
US 2004/0102289 A1    May 27, 2004

(30) Foreign Application Priority Data
Jul. 29, 2002   (JP) .............................. 2002-220138

(51) Int. Cl.
*F16H 61/06*    (2006.01)
(52) U.S. Cl. .................... 475/127; 477/154; 192/87.14
(58) Field of Classification Search ................ 477/143, 477/154, 155; 475/127, 128; 192/87.14; 74/731.1
See application file for complete search history.

(56) References Cited

U.S. PATENT DOCUMENTS

| | | | |
|---|---|---|---|
| 4,724,723 A | * 2/1988 | Lockhart et al. ............ | 477/102 |
| 5,029,494 A | * 7/1991 | Lentz et al. ................ | 477/148 |
| 5,947,864 A | * 9/1999 | Ohashi et al. .............. | 477/154 |
| 5,984,834 A | * 11/1999 | Miyamoto et al. .......... | 477/148 |
| 5,997,436 A | * 12/1999 | Shibuya et al. ............. | 477/154 |
| 6,007,458 A | 12/1999 | Ohashi et al. | |
| 6,450,920 B1 | * 9/2002 | Yu ............................. | 477/154 |
| 6,480,777 B1 | * 11/2002 | Sato et al. .................... | 701/60 |
| 6,508,742 B1 | * 1/2003 | Popp et al. .................. | 477/155 |
| 6,742,639 B1 | * 6/2004 | Aikawa et al. ............ | 192/3.61 |

FOREIGN PATENT DOCUMENTS

| EP | 0565383 A1 | * 10/1993 |
|---|---|---|
| JP | 10-153257 A | 6/1998 |
| JP | 11-182663 A | 7/1999 |

* cited by examiner

*Primary Examiner*—Richard M. Lorence
(74) *Attorney, Agent, or Firm*—Buchanan Ingersoll PC

(57) ABSTRACT

A control apparatus for controlling a shift operation in an automatic transmission includes a disengaging side controlling device for performing a feedback control so as to substantially match a slip amount calculated by a slip amount calculating device with a target slip amount calculated by a target slip amount calculating device when the calculated slip amount is judged to be in excess of the predetermined threshold value by a judging device. The target slip amount varies from a predetermined threshold value to a predetermined target value drawing an ideal trace for restraining a shift shock and is maintained at the predetermined target value. The control apparatus further includes an engaging side controlling device for increasing a torque to be transmitted to an on-coming friction engagement element in association with commencement of the feedback control.

13 Claims, 19 Drawing Sheets

M(s): Reference model

FIG. 7
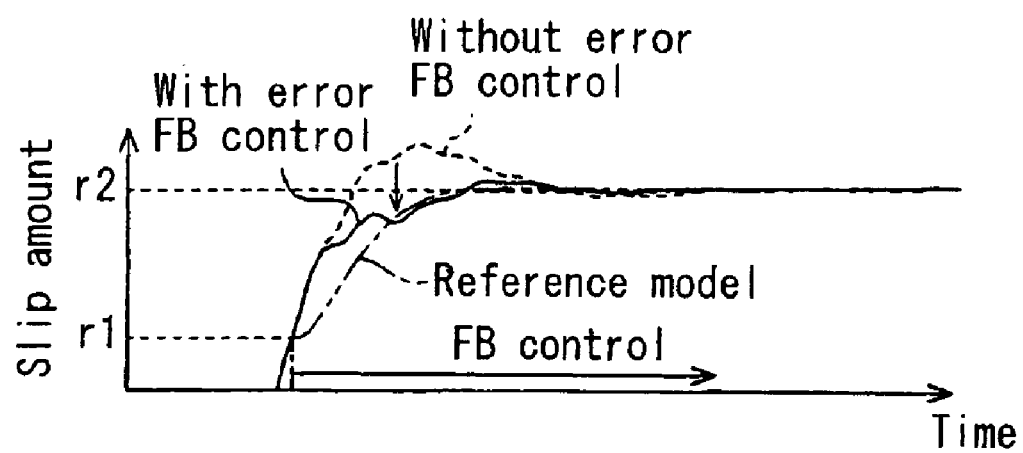
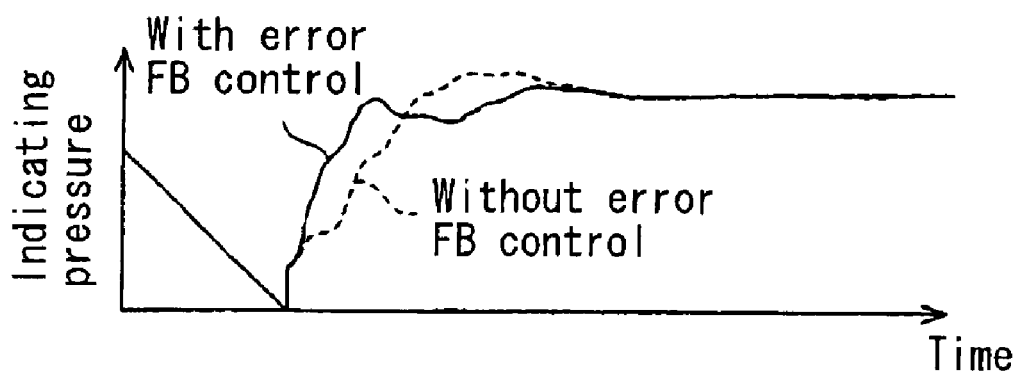

CONTROL APPARATUS FOR CONTROLLING A SHIFT OPERATION IN AN AUTOMATIC TRANSMISSION

CROSS REFERENCE TO RELATED APPLICATIONS

This application is based on and claims priority under 35 U.S.C. §119 with respect to a Japanese Patent Application 2002-220138, filed on Jul. 29, 2002, the entire content of which is incorporated herein by reference.

FIELD OF THE INVENTION

This invention generally relates to a control apparatus for controlling a shift operation in an automatic transmission and a method of designing the same.

BACKGROUND OF THE INVENTION

In a conventional control apparatus for controlling a shift operation in an automatic transmission, torque transmitted to an off-going friction engagement element, which is adapted to be disengaged at a time of shifting in the automatic transmission, is required to be reduced in accordance with increase of torque to be transmitted to an on-coming friction engagement element, which is adapted to be engaged at the time of shifting. A one-way clutch has been employed for reducing the torque transmitted to the off-going friction engagement element. However, somewhat recent developments have led to a control apparatus for controlling a shift operation in an automatic transmission, in which a clutch-to-clutch shift operation is performed by controlling oil pressure to be supplied to a clutch for the on-coming friction engagement (hereinafter, referred to as an engaging clutch) and a clutch for the off-going friction engagement element (hereinafter, referred to as a disengaging clutch) by use of a software. In this case, a shift stage is switched in the automatic transmission by controlling each engaging and disengaging clutch in mutual relation thereto.

According to the clutch-to-clutch shift operation by the control apparatus for controlling the shift operation in the automatic transmission, a shift feeling may deteriorate unless switching operation between the disengaging clutch and the engaging clutch is performed with high precision. Described below are examples of the unfavorable switching operation therebetween. When the torque to be transmitted to the engaging clutch is excessively increased relative to the decrease of the torque transmitted to the disengaging clutch, the automatic transmission may lapse into an interlocked condition, wherein torque for rotating an output shaft of the transmission is decreased. On the other hand, when the torque to be transmitted to the engaging has not been sufficiently increased relative to the decrease of the torque transmitted to the disengaging clutch, torque at a side of a turbine runner of a torque converter can not be appropriately transmitted to the automatic transmission such that racing of the turbine runner may occur. In this case, the shift feeling may deteriorate.

In order to overcome the above descriptions, in a conventional control apparatus for hydraulically operated vehicular transmission disclosed in a U.S. patent published as U.S. Pat. No. 6,007,458 corresponding to a Japanese Patent Laid-Open Publication No. 10-153257, the disengaging clutch has been designed to slip within a range of a predetermined gear ratio of the turbine rotational speed and the output shaft rotational speed,. Therefore, the disengaging clutch sensibly slips depending on a change of a transmission condition due to the slip. The control apparatus judges that the transmission condition has transferred from a torque phase to an inertia phase when a slip amount in the transmission is decreased. At this point, the oil pressure to be supplied to the engaging clutch is increased, and at the same time the oil pressure supplied to the disengaging clutch is immediately drained. Therefore, an engine (i.e. the turbine runner) can be effectively prevented from racing and the transmission condition can be transferred to the inertia phase at an early stage.

In a conventional gear shift control device of an automatic transmission disclosed in a Japanese Patent Laid-Open Publication No. 11-182663, the disengaging clutch slips by setting a speed for decreasing the oil pressure supplied to the disengaging clutch faster than a speed for increasing the oil pressure to be supplied to the engaging clutch. When the slip amount of the disengaging clutch reaches a predetermined amount, the transmission condition is transferred form the torque phase to the inertia phase by rapidly decreasing the oil pressure supplied to the disengaging clutch. Therefore, the transmission can be prevented from an inter lock condition.

Further, according to a conventional control apparatus for controlling a shift operation in an automatic transmission, which has been suggested by the applicant of the present invention, the disengaging clutch slips and a sip slip amount is maintained at an appropriate slip amount until the engaging clutch can be transmitted with sufficient torque. A racing amount of a turbine rotation is referred to for maintaining the slip amount at the appropriate slip amount. The racing amount of the turbine rotation can be determined by subtracting a value, which is calculated by multiplying an output rotational speed No by a gear ratio Geari of an actually selected shift stage, from a turbine rotational speed Nt. The feedback control can be performed for controlling the racing amount of the turbine rotation (=Nt−No.Gear1) to follow a target value.

In this case, the disengaging clutch has been designed to be released from the engaged condition and the engaging clutch is transferred to the disengaged condition along with control of the racing amount of the turbine rotation. Therefore, the transmission can be effectively prevented from the inter lock condition and the shifting feeling can be enhanced. Even when the increase of the oil pressure to be supplied to the engaging clutch is delayed, the oil pressure supplied to the disengaging clutch can be controlled at a preferable oil pressure level until the engaging clutch becomes ready for being supplied with the sufficient oil pressure. Therefore, the control apparatus can effectively prevent the rotation of the engine or the turbine runner from largely racing such that the shift feeling can be effectively prevented from becoming worse.

The output torque as one of the reference for judging the shifting feeling fluctucates depending on change of the turbine rotational speed, i.e. depending on acceleration of the turbine rotation. Accordingly, the output torque may fluctuate unless the slip amount of the disengaging clutch is appropriately controlled, so that the shift feeling may deteriorate.

According to the conventional control apparatus disclosed in the U.S. patent published as U.S. Pat. No. 6,007,458, the slip amount lies within the range of the predetermined speed ratio such that the slip amount just drifts as it is during a transient state until the gear ratio reaches the predetermined gear ratio. Thereore, the slip amount and the output torque can not be substantially controlled until the gear ratio reaches the predetermined gear ratio.

According to the conventional gear shift control device disclosed in the Japanese Patent Laid-Open Publication No. 11-182663, an actually detected slip amount referred to for performing the feedback control is identical to a target slip amount (i.e. a target value). Therefore, the slip amount can not be controlled immediately after the commencement of the feed-back control and the slip amount is modified to the target value after occurrence of overshooting. Therefore, it may cause backlash of an output shaft of the transmission.

A need thus exists for providing an improved control apparatus for controlling a shift operation in an automatic transmission and a method of designing the same.

SUMMARY OF THE INVENTION

According to an aspect of the present invention, in a control apparatus for controlling a shift operation in an automatic transmission having plural shift stages to be established by selecting plural friction engagement elements to be engaged or disengaged, an off-going friction engagement element of the plural friction engagement elements is switched from an engaged condition to a disengaged condition by reducing torque transmitted to the off-going friction engagement element at a time of shifting from a shift stage of the plural shift stages to the other shift stage thereof such that the off-going friction engagement element slips, and an on-coming friction engagement element of the plural friction engagement elements is switched from a disengaged condition to an engaged condition by increasing torque to be transmitted to the on-coming friction engagement element at the time of shifting.

The control apparatus includes a slip amount calculating means for calculating a slip amount based upon a rotational speed of an input shaft of the automatic transmission and a rotational speed of an output shaft thereof, a judging means for judging whether or not the calculated slip amount is greater than a predetermined threshold value by comparison, and a target slip amount calculating means for calculating a target slip amount. The target slip amount varied from the predetermined threshold value to a predetermined target value drawing an ideal trace for restraining a shift shock and is maintained at the predetermined target value. The control apparatus further includes a disengaging side controlling means for performing a feedback control so as to substantially match the calculated slip amount with the calculated target slip amount when the calculated slip amount is judged to be in excess of the predetermined threshold value by the judging means, and an engaging side controlling means for increasing the torque to be transmitted to the on-coming friction engagement element in association with commencement of the feedback control.

It is preferable that the engaging side controlling means increases the oil pressure supplied to the on-coming friction engagement element to a level of a stand-by pressure which does not generate the torque at the time of shifting, maintains the oil pressure being supplied to the on-coming friction engagement element at the stand-by pressure level until commencement of the feedback control, and increases the oil pressure being supplied to the on-coming friction engagement element to a level of an oil pressure required for shifting to an inertia phase after the commencement of the feedback control.

As described above, the feedback control according to the present invention is performed for substantially approximating the slip amount to the target slip amount drawing an ideal trace for restraining a shift shock in the transmission. Further, the feedback control can be performed during a transient stage from a stage where the slip amount exceeds the predetermined threshold value to a stage where the slip amount reaches the target value, thereby enabling to stabilize a slip change and to enhance the shift feeling.

According to another aspect of the present invention, in a method of designing the control apparatus for controlling the shift operation in the automatic transmission having the plural shift stages to be established by selecting the plural friction engagement elements to be engaged or disengaged, the method of designing includes steps of interpreting a response characteristic of a slip amount relative to an input to the automatic transmission as a transfer function within a frequency domain, defining a reference model capable of obtaining an ideal slip amount response characteristic for restraining a shift shock, constructing a feedback control system provided with an integral-proportional controller relative to the interpreted transfer function of the automatic transmission, and adjusting a proportional gain and an integral gain for the integral-proportional controller so as to substantially correspond or approximate the response characteristic of the slip amount in the feedback control system to the ideal response characteristic of the reference model.

BRIEF DESCRIPTION OF THE DRAWING FIGURES

The foregoing and additional features and characteristics of the present invention will become more apparent from the following detailed description considered with reference to the accompanying drawing figures wherein:

FIG. 7 is a time chart illustrating transit of the slip amount and the indicating pressure upon a slip feedback control;

DETAILED DESCRIPTION OF THE INVENTION

Preferred embodiments of the present invention will be described hereinbelow in detail with reference to the accompanying drawings.

Figure 1:
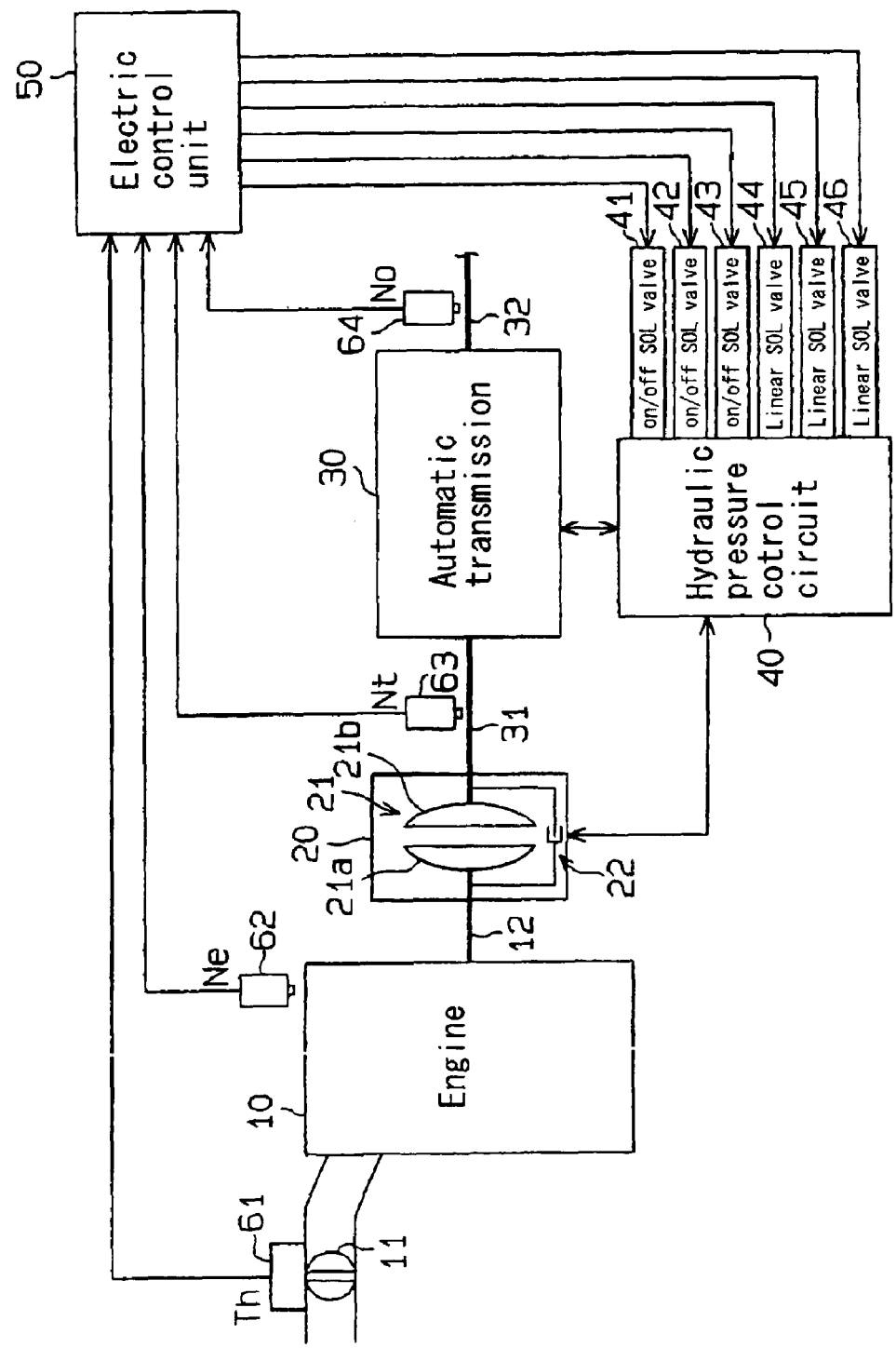
FIG. 1 is a block view schematically illustrating a control apparatus for controlling a shift operation in an automatic transmission according to embodiments of the present invention.

As seen in FIG. 1, a vehicle according to a first embodiment of the present invention is provided with an engine 10 as a vehicle driving power source, a fluid type torque converter 20 with a lock-up clutch 22a (described later), an automatic transmission 30, a hydraulic pressure control circuit 40 for controlling pressure of operating fluid (i.e. automatic transmission fluid (ATF)) supplied to the torque converter 20 and the automatic transmission 30, and an electric control unit 50, sending control indicating signals to the hydraulic pressure control circuit 40. Driving torque of the engine 10, which is increased/decreased in response to operation of an accelerator pedal (not shown), is transmitted to a drive wheel or a tire of a drive wheel via the torque converter 20, the automatic transmission 30, and a differential gear (not shown).

Figure 2:
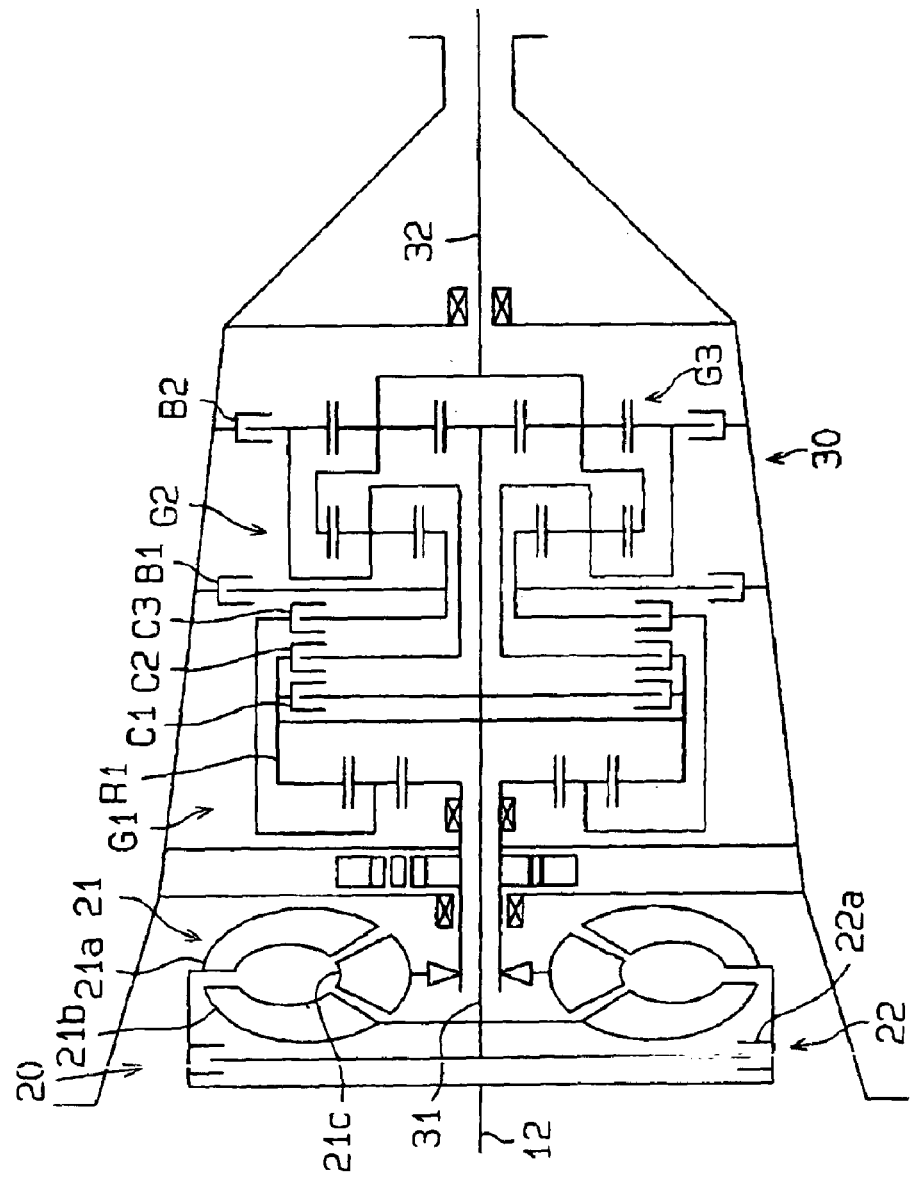
FIG. 2 is a view schematically illustrating the automatic transmission illustrated in FIG. 1.

As seen especially in FIGS. 1 and 2, the torque converter 20 includes a fluid type transmitting mechanism 21 capable of transmitting the torque from the engine 10 to the automatic transmission 30 via the operating fluid and a lock-up clutch mechanism 22 connected to the fluid type transmitting mechanism 21 in parallel therewith. The fluid type transmitting mechanism 21 is assembled with a pump impeller 21a connected to a torque converter input shaft 12 integrally rotated with a crank shaft (not shown) of the engine 10, a turbine runner 21b connected to an input shaft 31 of the transmission 30 and rotated in response to flow of the operating fluid generated by the pump impeller 21a, and a stator wheel 21c.

As seen in FIG. 2, the lock-up clutch mechanism 22 includes the lock-up clutch 22a (hereinafter, referred to as the L/U clutch 22a). The lock-up clutch mechanism 22 can establish an engaged condition, in which the torque converter input shaft 12 is operatively connected to the transmission input shaft 31 by the L/U clutch 22a such that these two shafts 12 and 31 can be integrally rotated, and a disengaged condition, in which the connection therebetween is released by the L/U clutch 22a. The engaged and disengaged conditions can be switched in response to the fluid amount (i.e. the fluid pressure) of the operating fluid to be supplied to and to be drained from the L/U clutch 22a by the hydraulic pressure control circuit 40.

The automatic transmission 30 performs a single reverse shift stage and six forward shift stages. As illustrated in FIG. 2, the automatic transmission 30 is provided with a first single pinion type planetary gear G1 with a ring gear R1, a second single pinion type planetary gear G2, a third single pinion type planetary gear G3, and plural friction engagement elements such as friction clutches C1, C2, C3, and friction brakes B1, B2. Table 1 shows a relationship between engaged/disengaged conditions of the respective friction engagement elements and shift stages performed with the engaged/disengaged friction engagement elements. The symbol ○ in the table 1 indicates that each corresponding friction engagement element is at the engaged condition to perform each shift stage and the absence of the symbol ○ therein indicates that each friction engagement element is at the disengaged condition.

TABLE 1

|  | C1 | C2 | C3 | B1 | B2 |
|---|---|---|---|---|---|
| Reverse shift stage |  |  | ○ |  | ○ |
| 1st shift stage | ○ |  |  |  | ○ |
| 2nd shift stage | ○ |  |  | ○ |  |
| 3rd shift stage | ○ |  | ○ |  |  |
| 4th shift stage | ○ | ○ |  |  |  |
| 5th shift stage |  | ○ | ○ |  |  |
| 6th shift stage |  | ○ |  | ○ |  |

As seen in FIG. 1, the hydraulic pressure control circuit 40 embeds three on/off solenoid valves 41, 42, 43 (hereinafter, referred to as on/off SOL valves 41, 42, 43) and three linear solenoid valves 44, 45, 46 (hereinafter, referred to as linear SOL valves 44, 45, 46), all of which are respectively controlled by the control indicating signals from the electric control unit 50. The hydraulic pressure control circuit 40 controls the fluid amount (or the fluid pressure) of the operating fluid to be supplied to (and to be drained from) the friction engagement elements of the transmission 30 and the lock-up clutch mechanism 22 based upon combinations of the electrically excited on/off SOL valves 41, 42, and 43. The hydraulic pressure control circuit 40 further controls the hydraulic pressure level of the operating fluid to be supplied thereto to be substantially the same as a line pressure PL level or lower than that in accordance with electrical excitation applied to the linear SOL valves 44, 45, and 46.

The electric control unit 50 is a microcomputer having a CPU, memories (ROM, RAM), and interfaces which all are not illustrated. The electric control unit 50 is connected to a throttle opening degree sensor 61, an engine rotational speed sensor 62, a turbine rotational speed sensor 63, and an output shaft rotational speed sensor 64. Signals respectively outputted from the sensors are inputted to the electric control unit 50.

The throttle opening degree sensor 61 detects an opening degree Th of a throttle valve 11 (hereinafter, referred to as a throttle opening degree Th) disposed in an inlet passage of the engine 10 and opened/closed in response to the operation of the accelerator pedal (not shown). The throttle opening degree sensor 61 outputs a signal representing the throttle opening degree Th of the throttle valve 11. The engine rotational speed sensor 62 detects a rotational speed of the engine 10 and outputs a signal representing an engine rotational speed Ne. The turbine rotational speed sensor 63 detects a rotational speed of the input shaft 31 of the transmission 30 and outputs a signal representing a turbine rotational speed Nt, i.e. a rotational speed of the input shaft of the transmission 30. The output shaft rotational speed sensor 64 detects a rotational speed of an output shaft 32 of the transmission 30 (i.e. an output rotational speed) and outputs a signal representing an output rotational speed No of the output shaft 32 of the transmission 30. The output rotational speed No proportionally corresponds to a vehicle speed. The output shaft rotational speed sensor 64 is fixedly attached to a transmission housing (not shown) integrally assembled with the engine 10 by an engine mount.

The electric control unit 50 stores a shift map and a L/U clutch operation map, both of which are designed based upon the output rotational speed No and the throttle opening degree Th. The on/off SOL valves 41, 42, 43 and linear SOL valves 44, 45, 46 are controlled by the electric control unit 50 in accordance with the position of an operational status point relative to a L/U clutch engaged zone when the operational status point crosses a shift line illustrated in the shift map. The operational status point is defined by the detected output rotational speed No and throttle opening degree Th. Accordingly, the engaged/disengaged condition of each friction engagement element can be switched as being explained in the table 1 and the engaged/disengaged condition of the L/U clutch 22a can be also switched.

Next, described hereinbelow is a clutch-to-clutch shift operation. According to the first embodiment of the present invention, the clutch-to-clutch shift operation is actually controlled by the control apparatus for controlling the shift operation in the transmission 30 at a time of shifting from a second shift stage to a third shift stage.

(Outline of the Present Invention)

Figure 3:
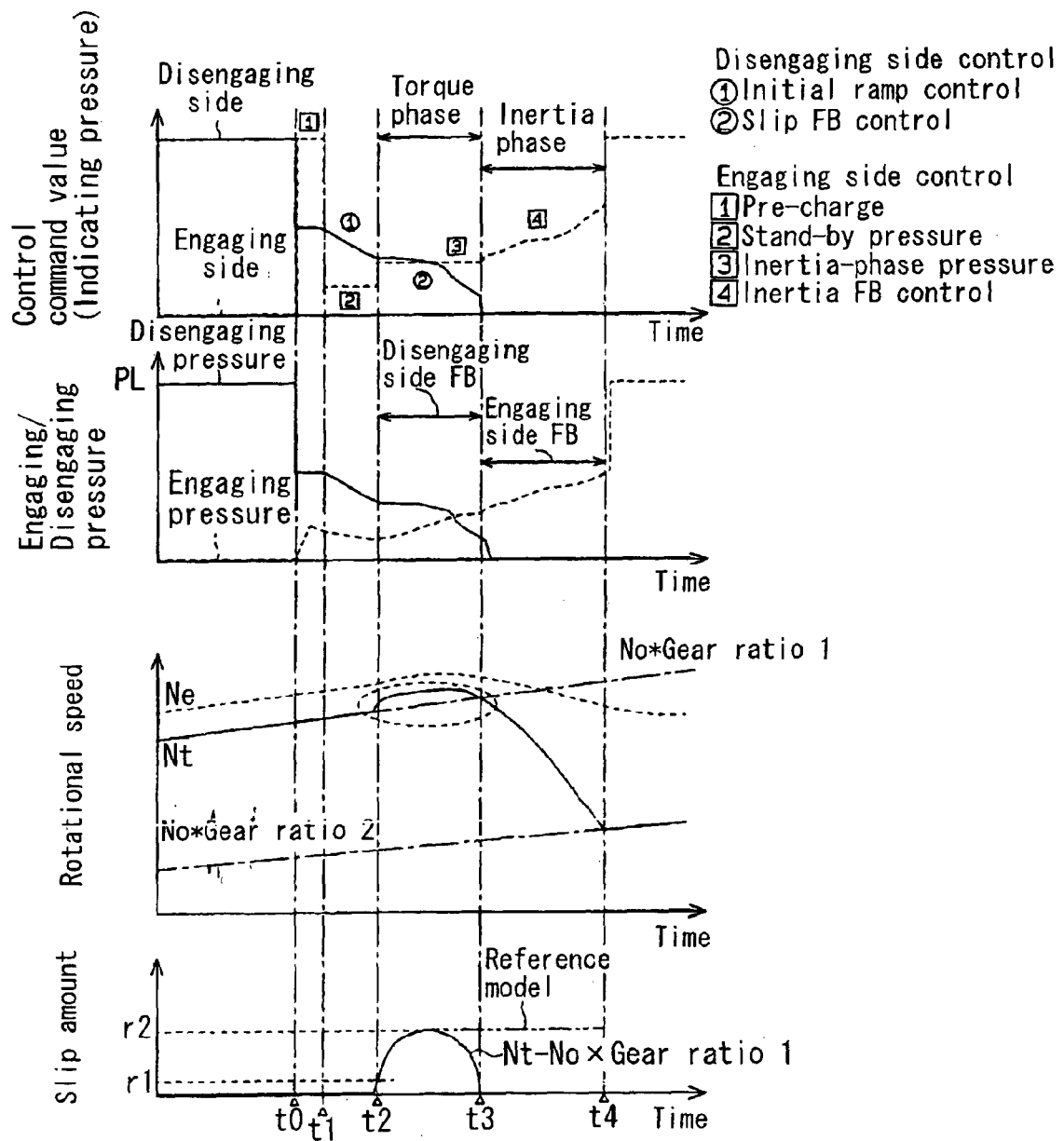
FIG. 3 is a time chart illustrating indicating pressures for off-going and on-coming friction engagement elements, hydraulic pressures for the off-going and on-coming friction engagement elements, a turbine rotational speed, an output rotational speed, and an actual slip amount according to the embodiments of the present invention.

With reference to FIG. 3, the following description will be given for explaining the hydraulic pressure control at the time of shifting from the second shift stage to the third shift stage in the automatic transmission 30. Assuming that the aforementioned operational status point crosses the up-shift line from the second shift stage to the third shift stage at a time of to, the control apparatus outputs the up-shift start signal to the electric control unit 50. Therefore, as explained by Table 1, the electric control unit 50 commences control of the hydraulic pressure being supplied to an off-going friction engagement element (a friction brake B1) and the hydraulic pressure to be supplied to an on-coming friction engagement element (a friction clutch C1).

The electric control unit 50 performs an initial ramp control for decreasing the hydraulic pressure being supplied to the off-going friction engagement element (hereinafter, referred to as a disengaging pressure) in response to a control command value (i.e. an indicating pressure) for the off-going friction engagement element. In the initial ramp control, the disengaging pressure is rapidly decreased from the line pressure PL level and is then gradually decreased. Therefore, the torque being transmitted to the off-going friction engagement element is decreased and starts slipping. The slip amount of the off-going friction engagement element substantially corresponds to a difference between the turbine rotational speed Nt and the output rotational speed No multiplied by a gear ratio of the shift stage, established in the automatic transmission 30. According to the first embodiment of the present invention, the gear ratio represents a gear ratio of the second shift stage therein. Further, the slip amount is referred to as an index for controlling the off-going friction engagement element.

The electric control unit 50 decreases the disengaging pressure being supplied to the off-going friction engagement element while always monitoring the slip amount. In response to the slip amount exceeding a predetermined threshold value r1 at a time t2, the electric control unit 50 determines that the off-going friction engagement element started slipping and commences a slip feedback control (hereinafter, referred to as a slip FB control) based upon the slip amount as an index for controlling the off-going friction engagement element. In the slip FB control, the slip amount is controlled along with an ideal transit trace from the predetermined threshold value r1 to a predetermined target value r2 and is maintained at the predetermined target value r2. Therefore, according to the first embodiment of the present invention, the slip amount can be smoothly increased up to the predetermined target value r2 as time goes on.

Meanwhile, the electric control unit 50 performs a pre-charge control for rapidly increasing the hydraulic pressure to be supplied to the on-coming friction engagement element (hereinafter, referred to as an engaging pressure) at t0 in response to a control command signal (i.e. an indicating signal) for the on-coming friction engagement element. In response to termination of the pre-charge control at a time t1, a stand-by pressure control is started by the electric control unit 50, in which the engaging pressure can be set at a hydraulic pressure immediately before torque transmitting to the on-coming friction engagement element, i.e. can be set at a stand-by pressure, and can be then maintained at the stand-by pressure level till the time t2 at which the slip FB control commences.

In response to the commencement of the slip FB control at t2, the electric control unit 50 starts an inertia-phase pressure control, in which the engaging pressure is gradually increased up to a pressure, which is required for transiting from a torque phase to an inertia phase, as time goes on. Therefore, the slip amount starts decreasing in response to the torque increasingly transmitted to the on-coming friction engagement element along with the increase of the engaging pressure. In the meantime, the slip amount is controlled to be maintained at the predetermined target value r2 by the slip FB control such that the decreasing pressure is decreased so as to increase the slip amount. At this point, the torque released from the off-going friction engagement element substantially corresponds to the torque transmitted to the on-coming friction engagement element. As the above-described condition progresses, the torque which had been transmitted to the off-going friction engagement element is transmitted to the on-coming friction engagement element. Therefore, the on-coming friction engagement element can be transmitted with sufficient torque to be transited to the engaged condition at a time t3 and the slip amount becomes substantially zero.

When the slip amount becomes substantially zero at the time t3, the electric control unit 50 interprets that a torque phase was terminated. In the torque phase, the torque form the off-going friction engagement element is transited to the on-coming friction engagement element. In this case, the slip FB control is terminated and at the same time a ramp control is performed for completely draining the disengaging pressure from the off-going friction engagement element. The electric control unit 50 then commences a feed back control (hereinafter, referred to as an inertia FB control) in which a change rate of the turbine rotational speed Nt ΔNt is controlled to match with a target rotational speed, change rate ΔMNT. As time goes on, the turbine rotational speed Nt substantially matches with the output rotational speed No multiplied by a gear ratio at a time t4. At this point, the electric control unit 50 controls the engaging pressure up to the line pressure PL such that the up-shifting operation from the second shift stage to the third shift stage is terminated. The gear ratio employed here represents a gear ratio of the third shift stage according to the first embodiment of the present invention.

(Principle of the Slip FB Control)

Figure 4:
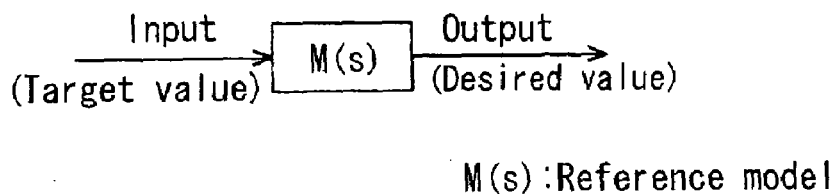
FIG. 4 is a block view for explaining a reference model for the embodiments of the present invention.

Next, the following description will be given for explaining the principle of the slip FB control performed from the time t2 to the time t3. In order to obtain a good shift feeling, the slip amount is demanded to reach the predetermined target value r2 during restraining the output torque from fluctuating. The slip amount is also demanded to be maintained at the target value r2 until the on-coming friction engagement element is transmitted with the torque. In order to satisfy the aforementioned demands, according to the first embodiment of the present invention, a reference model M(s) illustrated in FIG. 4 is defined and a transfer function for the reference model M(s) is estimated so as to obtain a good shift feeling. That is, the transfer function of the reference model M(s) is determined on a purpose of changing the slip amount to the target value r2 at a predetermined time basis along with an ideal transit trace when the reference model M(s) is inputted with a value which changes in a stair step manner from the predetermined threshold value r1 to the predetermined target value r2. In this case, it is preferable that the slip amount is changed to the target value r2 with no overshoot thereof. The symbol "s" is a differential operator and the reference model M(s) is expressed in accordance with a polynomial expression with the differential operator"s".

Figure 5:
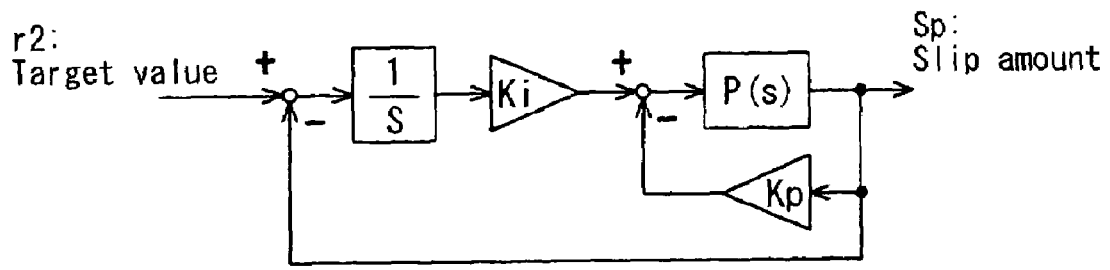
FIG. 5 is a block view illustrating a closed loop for applying an IP control to a controlled object P(s) of the automatic transmission illustrated in FIG. 2.

Next, the following description will be given for explaining a closed loop for applying an integral-proportional control to a controlled object P(s) which represents the automatic transmission 30 according to the first embodiment of the present invention. As explained in FIG. 5, the controlled object P(s) is determined by way of a system identification and is expressed in accordance with a polynomial expression with the differential operator "s". The input of the controlled object P(s) is the disengaging pressure and an output thereof is an actual slip amount Sp. Symbols "Ki" and "Kp" represent gains for an integral element and a proportional element, respectively. An IP controller is designed by a model matching method so as to match the output (i.e. the actual slip amount Sp) from the controlled object P(s) with a desired value outputted from the reference model M(s) when the input to the closed loop is the predetermined target value r2. The IP controller is also denoted in accordance with a polynomial expression with the differential operator "s".

When the disengaging pressure is controlled by use of the IP controller described above, the actual slip amount SP outputted from the controlled object P(s) can be smoothly increased following the desired value outputted from the reference model M(s). Therefore, the output torque from the automatic transmission can be effectively restrained from fluctuating.

Hereinafter, it is preferable that the IP controller is designed in consideration of disturbances such as an individual difference thereof upon being mass-produced, fluctuation of the feature of the operating fluid due to temperature change, and aging distortion including wear of the friction engagement elements and deterioration of the operating fluid. Especially, the clutch-to-clutch shift operation may be easily affected by these aforementioned disturbances. Therefore, it has been demanded that the IP controller be designed not to be easily affected by the disturbances or to absorb the disturbances.

In order to satisfy the above-described demands, a closed loop for performing an error feedback control (hereinafter, referred to as an error FB control) is employed. In the closed loop for the error FB control, an error (a difference) between the desired value outputted from the reference model M(s) and the actual slip amount Sp outputted from the IP controller, i.e. from the controlled object P(s) as the transmission 30 is calculated. The error is multiplied by an error feedback gain T. Therefore, the error can be effectively controlled to be reduced and the disturbances can be effectively absorbed. That is, the clutch-to-clutch shift operation can be effectively performed in the automatic transmission 30 which cannot be easily affected by the disturbances including the above description.

As illustrated in FIG. 7, the actual slip amount Sp applied with the error FB control can be controlled to smoothly reach the predetermined target value r2 while being restrained from overshooting. Further, the actual slip amount Sp applied with the error FB control can be controlled along with the desired value outputted from the reference model M(s).

(The Way to Determine the Actual Slip Amount Sp)

The following description will be given for explaining the way to determine the actual slip amount Sp for the slip FB control with reference to the attached drawing FIGS. 8 through 11.

Generally speaking, the actual slip amount Sp, which is referred to for judging whether or not the off-going friction engagement element has started slipping prior to the slip FB control, is calculated based upon a difference between the turbine rotational speed Nt and the output rotational speed No multiplied by a gear ratio G1 (i.e. the gear ratio at the second shift stage) such that the slip amount can be expressed in accordance with the following formula:

the actual slip amount $Sp=Nt-No\times G1$.

However, each detected rotational speed Nt and No may be superposed with vibration such as sensor noise and disturbance on a road surface. If that is the case, despite the actual slip amount Sp being smaller than the predetermined threshold value r1, the actual slip amount Sp may be detected in excess of the value r1. Accordingly, the slip detection may be performed in error. Recently, in order to attenuate the vibration from each detected rotational speed Nt and No and prevent the misjudgment of the slip amount, a filtered slip amount has been utilized. In this case, the vibration with a frequency F1 (i.e. a first predetermined frequency component) or greater than that can be attenuated (i.e. applied with a first filtering process). Therefore, the slip amount can be precisely detected by performing the slip start judgment based upon the filtered slip amount.

The torque transmitted to the output shaft 32 of the transmission 30 is decreased in response to the commencement of the slip of the off-going friction engagement element. Therefore, the output rotational speed No is superposed with vibration of a drive system due to intolerance of a propeller shaft, the drive wheel, or the engine mount. If the slip FB control is performed based upon the output rotational speed No superposed with the vibration of the drive system, the vibration of the turbine rotational speed Nt may be unnecessarily magnified due to the slip FB control. The magnified vibration may cause further fluctuation of the output rotational speed No. In this case, the fluctuation of the output rotational speed No cannot be diverged and controlled eventually, thereby disabling to stabilize the shift feeling.

In order to overcome the above-described problems, the Japanese Patent Laid-Open Publication published as No. 1999-182663 discloses a control apparatus for filtering the slip amount for the slip FB control. Assuming that the vibration of the drive system superposed on the output rotational speed No possesses a relatively low frequency, a cutoff frequency of the filter is generally designed to be lower than the frequency level of the drive system vibration. However, the filter with a low cutoff frequency possesses a relatively large time constant. Therefore, especially when the slip amount reduces at a relatively high speed at a time of the torque transmitting to the on-coming friction engagement element, the slip FB control may delay. Therefore, the filtered slip mount reduction may delay even when the slip amount has actually decreased in response to the torque transmitting to the on-coming friction engagement element. As a result of this, the disengaging pressure reduction may delay. In this case, the off-going friction engagement element has been still applied with the torque even when the on-coming friction engagement element has been already applied with the torque such that the transmission 30 becomes under the interlocked condition and the shift feeling may deteriorate.

Figure 8:
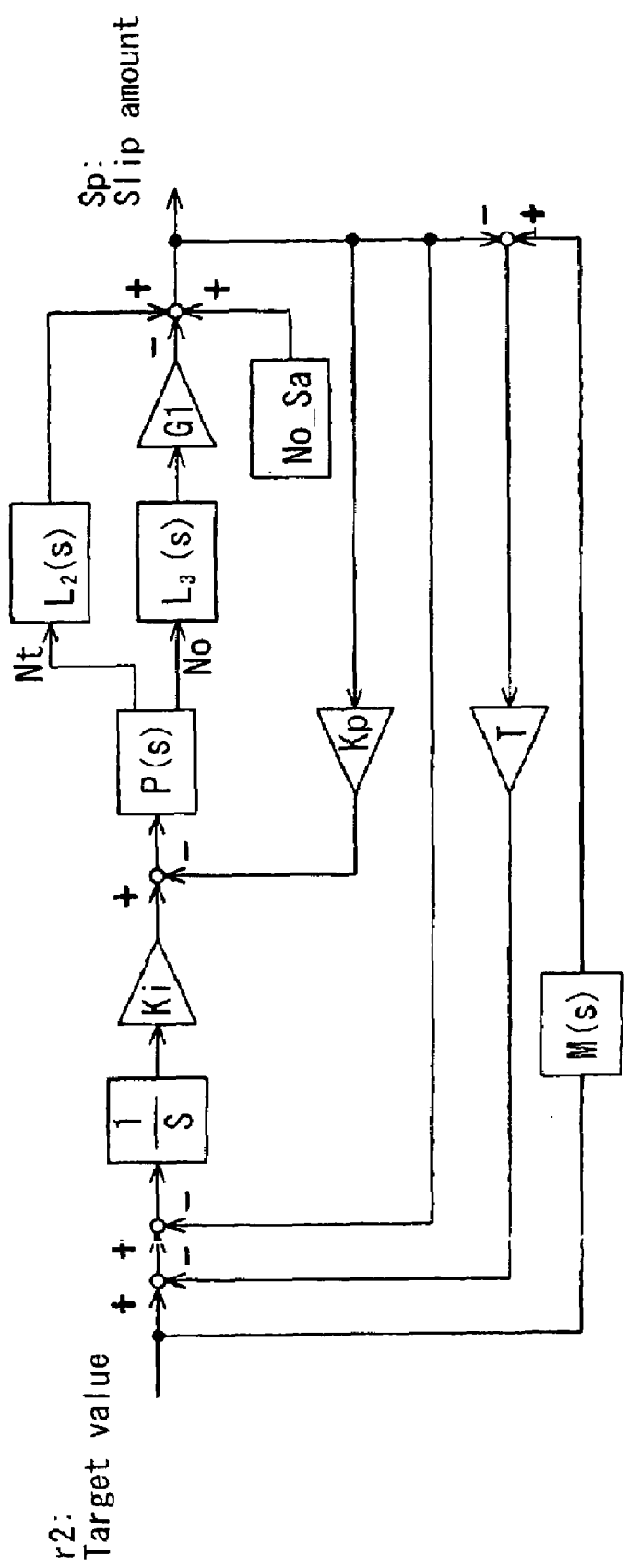
FIG. 8 is a block diagram illustrating an entire system for performing the slip feedback control.
Figure 9:
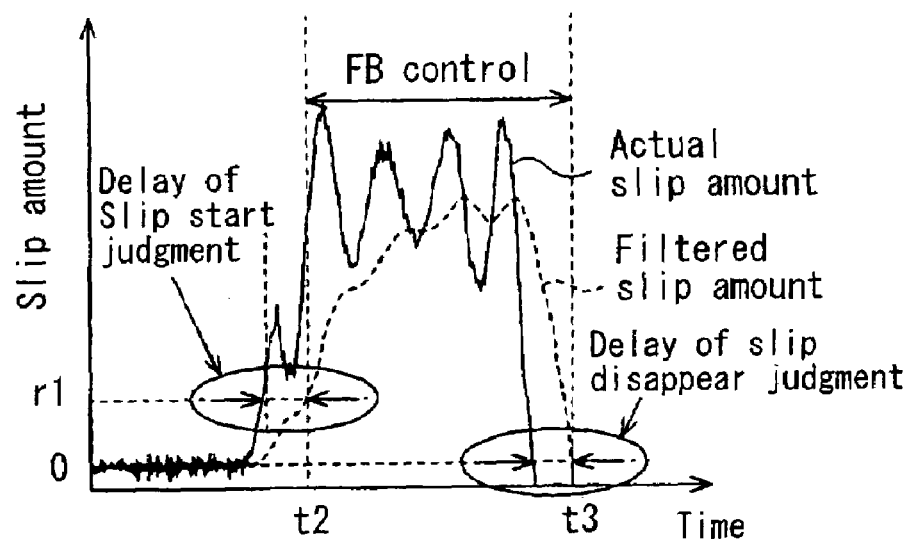
FIG. 9 is a time chart illustrating filtering operation.

In light of foregoing, as illustrated in FIG. 8, according to the first embodiment of the present invention, the turbine rotational speed Nt is applied with a filtering process (i.e. a second filtering process) for eliminating noise with a cutoff frequency F2 (a second predetermined frequency component) and a transfer function L2(s). The output rotational speed No is applied with a filtering process (i.e. a third filtering process) for eliminating the drive system vibration with a cutoff frequency F3 (i.e. a third predetermined frequency component) and a transfer function L3(s). The slip amount can be determined based upon the filtered turbine rotational speed and the filtered output rotational speed. In other words, the slip amount can be calculated in a different manner suitable for each shift stage, i.e. in a manner suitable for the stage prior to the commencement of the slip FB control and in a different manner suitable for the stage, after the commencement of the slip FB control. According to the first embodiment of the present invention, the magnitude of the cutoff frequencies F1, F2, and F3 are expressed as follow in consideration of the noise and the drive system frequency:

$$F3<F1<F2.$$

Figure 6:
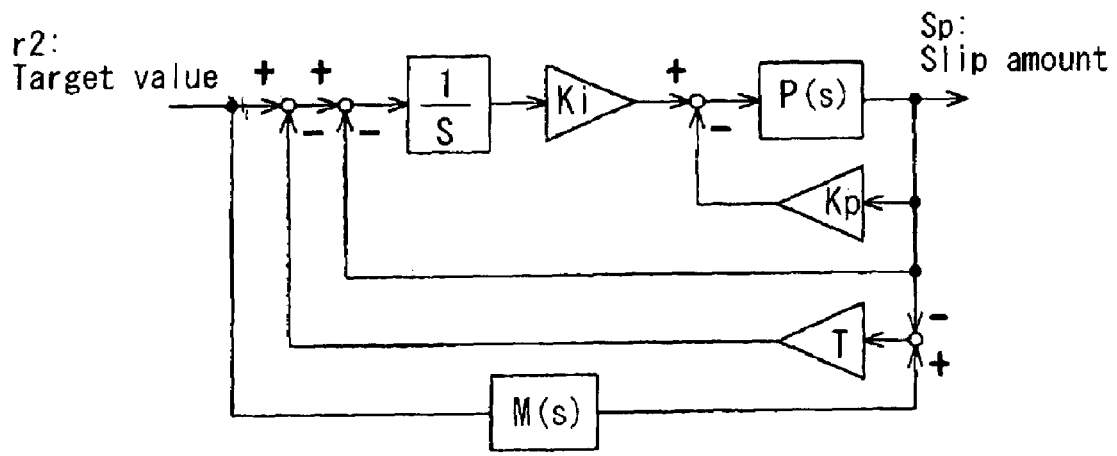
FIG. 6 is a block view illustrating a closed loop for performing an error feedback control according to the embodiments.

The transfer functions L2(s) and L3(s) are adjusted so as not to affect on the characteristics of the closed loop illustrated in FIG. 6 for the slip FB control.

However, the slip FB control may delay when the slip amount is filtered with the low cutoff frequency (herein, filtering the output rotational speed with the transfer function L3(s)). Therefore, the slip amount calculated based upon the filtered rotational speed results in greater than the actual slip amount Sp. In light of foregoing, an offset amount No_Sa is obtained, which represents a difference between the filtered output rotational speed and the output rotational speed No detected by the output shaft rotational speed sensor 64. The error between the actual slip amount Sp and the filtered slip amount can be absorbed by correcting the filtered output rotational speed with the offset amount No_Sa. That is, as illustrated in FIG. 8, the slip amount based upon the filtered rotational speeds Nt and No is expressed in accordance with the following formula:

$$Sp=L2(s)\cdot Nt-L3(s)\cdot No\cdot G1.$$

The slip amount Sp is corrected by the offset amount No_Sa and is ultimately expressed in accordance with the following formula:

$$Sp=L2(s)\cdot Nt-L3(s)\cdot No\cdot G1+No\_Sa.$$

Figure 10:
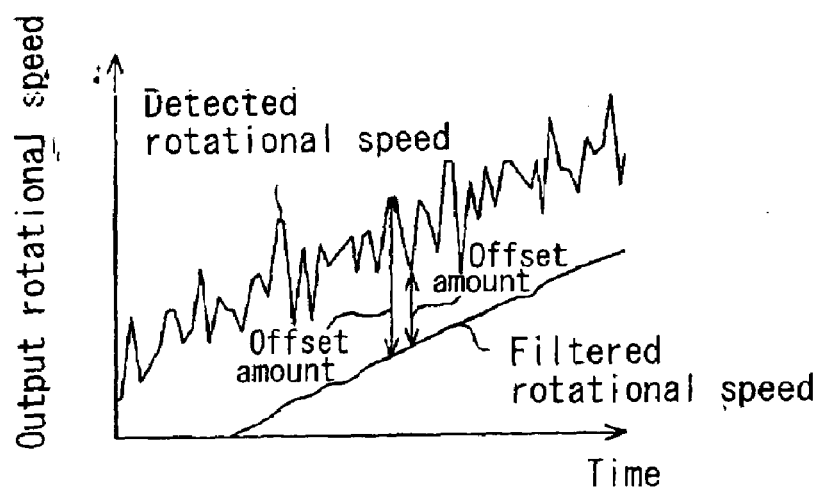
FIG. 10 is a time chart illustrating offsetting operation.

As described above, the output rotational speed No has been superposed with noise such as sensor noise. If the offset amount No_Sa at the time of t2 is obtained simply by calculating the difference (=NO−L3(s)·No) between the detected output rotational speed No and the filtered output rotational speed, the offset amount No_Sa may fluctuate depending on a timing for determining the offset amount No_Sa. If that is the case, the slip amount Sp may not be detected precisely. As illustrated in FIG. 10, the offset amount No_Sa may fluctuate depending on the timing for determining the offset amount No_Sa.

In light of foregoing, the offset amount No_Sa is determined so as to set the actual slip amount Sp expressed in the above-described formula at the predetermined threshold value r1 in consideration of the slip amount at the predetermined threshold value r1 at the time of t2 for the slip start judgment. In this case, the offset amount No_Sa is expressed in accordance with the following formula:

$$No\_Sa=L2(s)\cdot Nt-L3(s)\cdot No\cdot G1-r1.$$

In the slip FB control after the slip start judgment, the slip amount Sp is corrected and calculated based upon the offset amount NO_Sa in accordance with the following formula:

$$Sp=L2(s)\cdot Nt-L3(s)\cdot No\cdot G1+No\_Sa.$$

Figure 11:
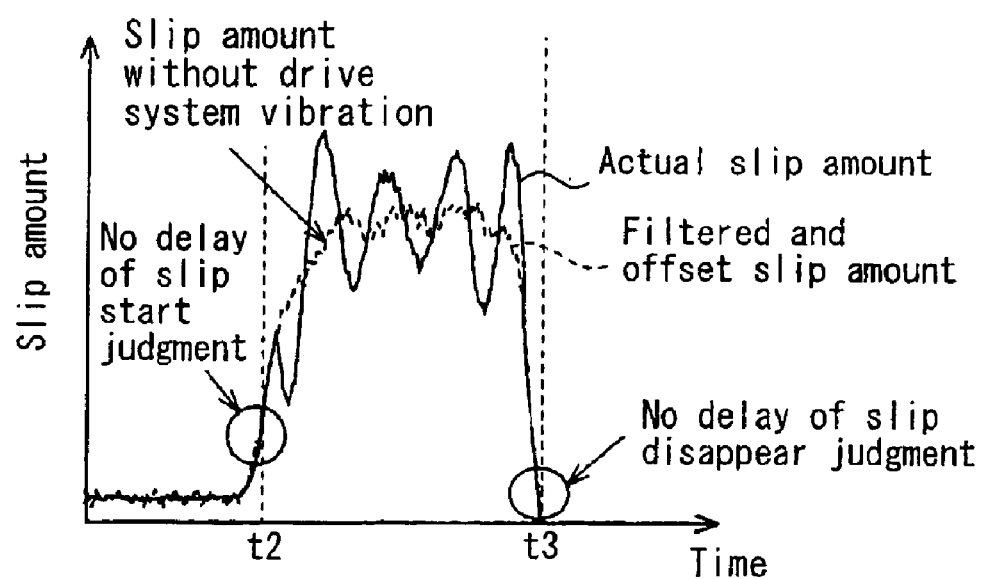
FIG. 11 is a time chart illustrating the filtering operation and the offsetting operation.

FIG. 11 shows a time chart illustrating a transit of the slip amount corrected with the offset amount No_Sa calculated as described above. As illustrated in FIG. 11, according to the first embodiment of the present invention, the off-going friction engagement element can be effectively controlled no later than the slip amount decrease in response to the torque transmitting to the on-coming friction engagement element. Therefore, the slip FB control can be effectively performed by use of the stabilized output rotational speed No of which drive system vibration had been attenuated or eliminated therefrom, thereby leading to restrain the vibration form being magnified by the slip FB control. As described above, the clutch-to-clutch shift operation can be smoothly performed in the automatic transmission 30.

(Operation)

Next, described below is the substantial operation of the control apparatus for controlling the shift operation in the automatic transmission 30 at the time of shifting from the second shift stage to the third shift stage according to the first embodiment of the present invention.

Figure 12:
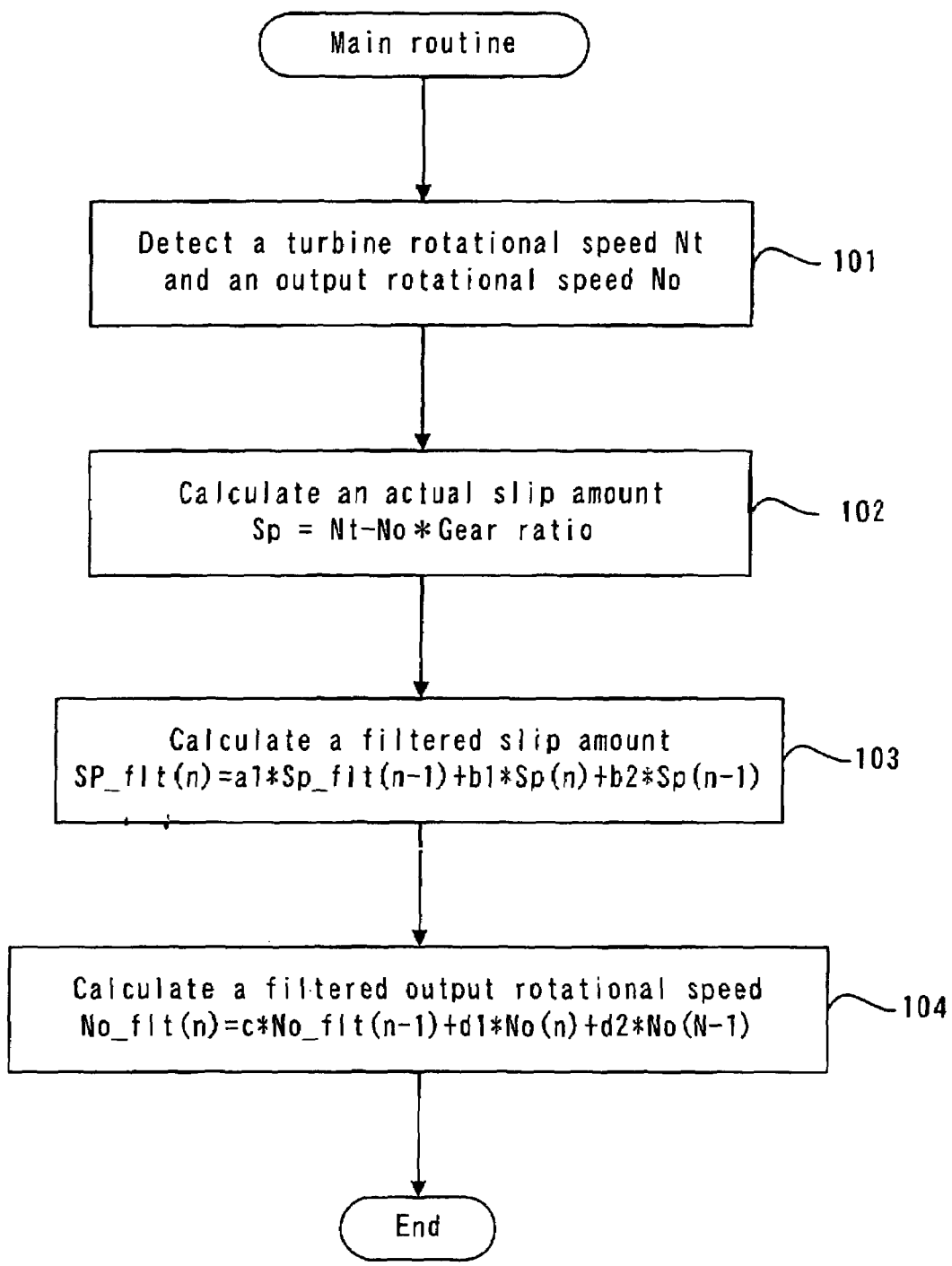
FIG. 12 is a flowchart for explaining a main routine performed by a CPU of an electric control unit illustrated in FIG. 1.

First, with reference to a flowchart illustrated in FIG. 12, the following description will be given for explaining a filtering process of a main routine performed by the CPU of the electric control unit 50. The main routine is repeatedly performed at a predetermined time basis such as every 5 milliseconds when an electric power has been supplied to the CPU. The CPU starts the routine from step 101 and determines a current turbine rotational speed Nt and a current output rotational speed No based upon a signal detected by each sensor. The CPU proceeds to step 102 (i.e. a slip amount calculating means) for calculating a current actual slip amount Sp in accordance with the following formula:

$$Sp=Nt-No \cdot \text{Gear ratio}.$$

According to the first embodiment of the present invention, the gear ratio represents the gear ratio G1 for the second shift stage. At step 103, the CPU computes a filtered slip amount Sp_flt in accordance with the following formula:

$$Sp\_flt(n)=a1 \cdot Sp\_flt(n-1)+b1 \cdot Sp(n)+b2 \cdot Sp(n-1).$$

Here, the variables "n" and "n−1" in the above formula represent each value detected or calculated through the routine of this time or through the routine of the previous time. The coefficients "a1", "b1", and "b2" were obtained by discretizing the filtering process, i.e. the transfer function L1(s). Therefore, the filtered slip amount Sp_flt can be effectively restrained from being affected by vibration such as sensor noise and road disturbances which may cause at a control stage apart from the slip FB control. Further, a stabilized slip FB control can be performed by comparing the filtered slip amount Sp_flt with the predetermined threshold value r1. The CPU then proceeds to step 104 for calculating a filtered output rotational speed No_flt in accordance with the following formula:

$$No\_flt(n)=c \cdot No\_flt(n-1)+d1 \cdot No(n)+d2 \cdot No(n-1).$$

The coefficients "c", "d1", and "d2" are obtained by discretizing the filtering process, i.e. the transfer function L3(s). Therefore, the filtered output rotational speed No_flt does not include the drive system vibration which may cause during the slip FB control.

According to the first embodiment of the present invention, the turbine rotational speed Nt is not applied with a filtering process. In this case, the transfer function L2(s) is set at 1. The turbine rotational speed Nt detected by the sensor is referred to for the slip FB control. Alternatively, the turbine rotational speed Nt can be filtered so as to attenuate or eliminate noise therefrom. In this case, the filtered turbine rotational speed can be calculated in the same manner as the filtered output rotational speed No_flt at step 104.

The CPU then terminates the main routine after computing the filtered output rotational speed No_flt at step 104.

Figure 13:
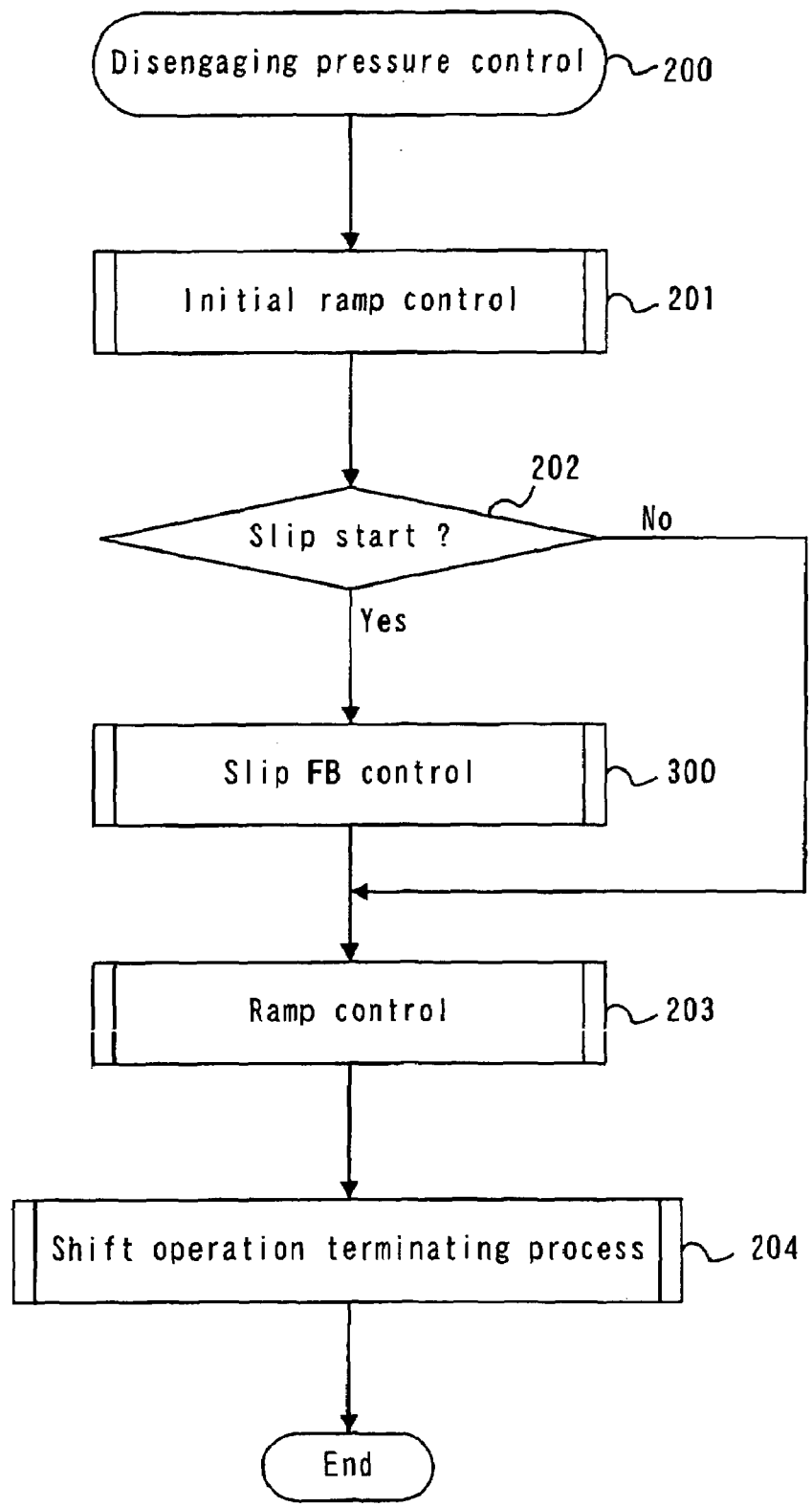
FIG. 13 is a flowchart for explaining a disengaging pressure control routine performed ty the CPU.

Next, with reference to a flowchart illustrated in FIG. 13, the following description will be given for explaining a disengaging pressure control routine performed by the CPU of the electric control unit 50. This routine commences in response to a shifting operation start command signal for up-shifting from the second shift stage to the third shift stage. Based upon this control timing, the CPU starts this routine from step 200 and proceeds to step 201 for starting an initial ramp control. In the initial ramp control, the CPU rapidly decreases the disengaging pressure from the line pressure PL level and then slow down the decreasing speed gradually. The CPU then proceeds to step 202 (i.e. a judging means) for performing a slip start judgment. More particularly, the CPU judges at step 202 whether or not the filtered actual slip amount Sp_flt is greater than the predetermined threshold value r1. The filtered actual slip amount Sp_flt has been calculated at step 103 of the main routine.

Figure 14:
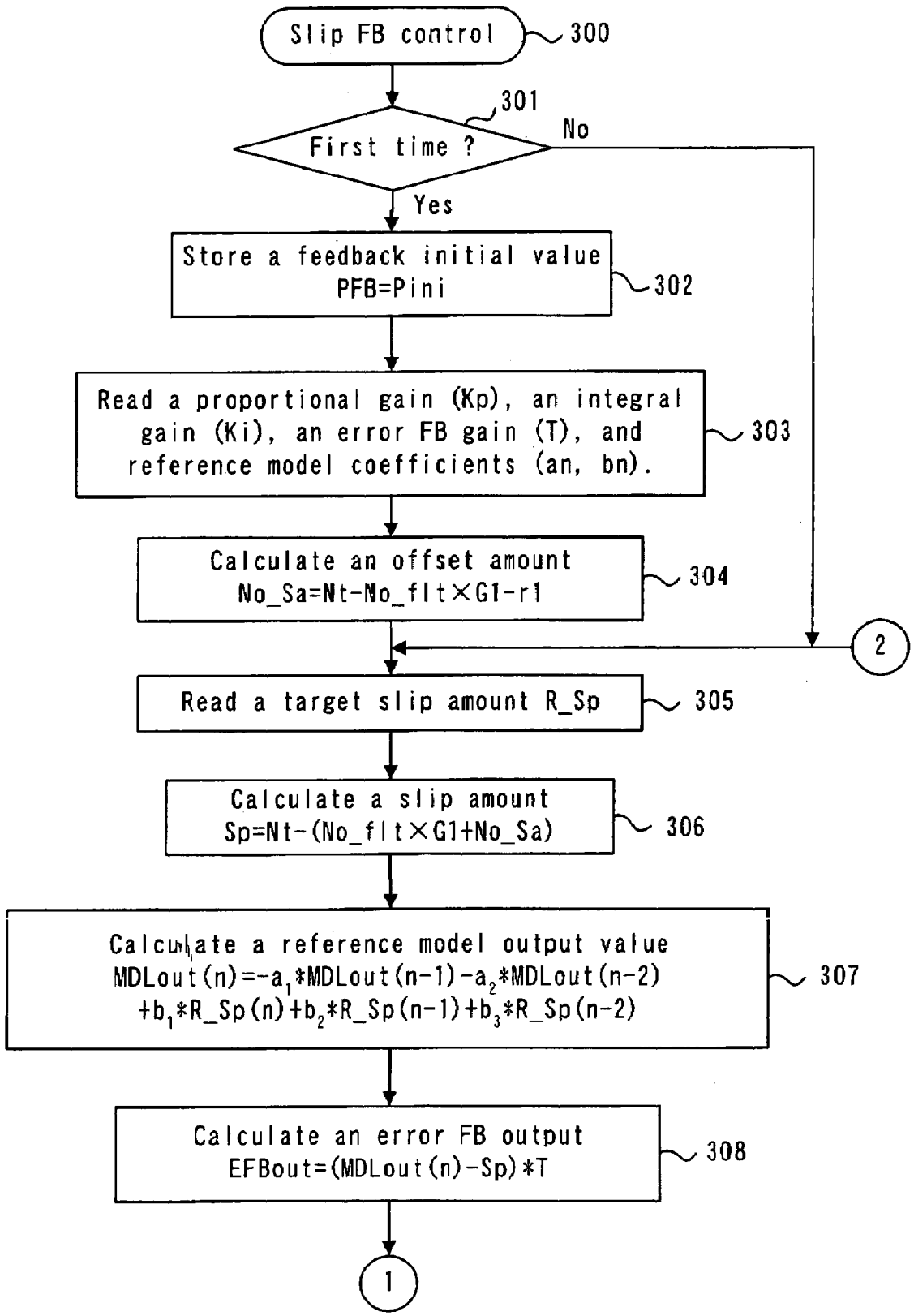
FIG. 14 is a flowchart for explaining a sub-routine of the disengaging pressure control routine illustrated in FIG. 13.

An affirmative judgment (YES) is obtained when the CPU judges at step 202 that the off-going friction engagement element has already slipped. The CPU then proceeds to step 300 for performing the slip FB control illustrated in FIG. 14. At step 301, the CPU judges whether or not the slip FB control is first performed this time after shifting to the slip FB control from the disengaging pressure control routine.

An affirmative judgment (YES) is obtained when the CPU judges at step 301 that this slip FB control is first performed. The CPU then proceeds to step 302 for storing a current indicating pressure (a current control command value) Pini at a time of commencing the slip FB control as a feedback initial value PFB.

The CPU then proceeds to step 303 for reading in a proportional gain Kp, an integral gain Ki, an error feedback gain T, and a reference model coefficient (an, bn), all of which are for the second shift stage in the transmission 30. The reference model coefficients (an, bn) are obtained by discretizing the reference model M(s). At step 304, the CPU computes the offset amount No_Sa for the output rotational speed in the following formula. The filtered output rotational speed No_flt employed in the formula has been computed at step 104 of the main routine.

$$No\_Sa=Nt-No\_flt \cdot G1-r1.$$

The CPU then proceeds to step 305 (i.e. a target slip amount calculating means). A negative judgment (NO) is obtained when the CPU does not judge at step 301 that the slip FB control of this time is first performed. In this case, the CPU also proceeds to step 305 without performing the above-described steps 302, 303, and 304. At step 305, the CPU reads in a target slip amount R_Sp for the second shift stage and then proceeds to step 306 for computing the current actual slip amount Sp in accordance with the following formula:

$$Sp=Nt-(No\_flt \cdot G1+No\_Sa).$$

The CPU then proceeds to step 307 for calculating a reference model output value MDLout, which is the desired value outputted from the reference model M(s), in accordance with the following formula:

$$MDLout(n)=-a1MDLout(n-1)-a2 \cdot MDLout(n-2) +b1 \cdot R\_Sp(n)+b2 \cdot R\_Sp(n-1)+b3 \cdot R\_Sp(n-2).$$

The CPU then proceeds to step 308 (i.e. a disengaging side controlling means) for calculating an error FB output value EFBout by subtracting the current actual slip amount Sp from the reference model output value MDLout(n) and by being multiplied by the error FB gain T in accordance with the following formula:

$$EFBout=(MDLout(n)-Sp) \cdot T.$$

Figure 15:
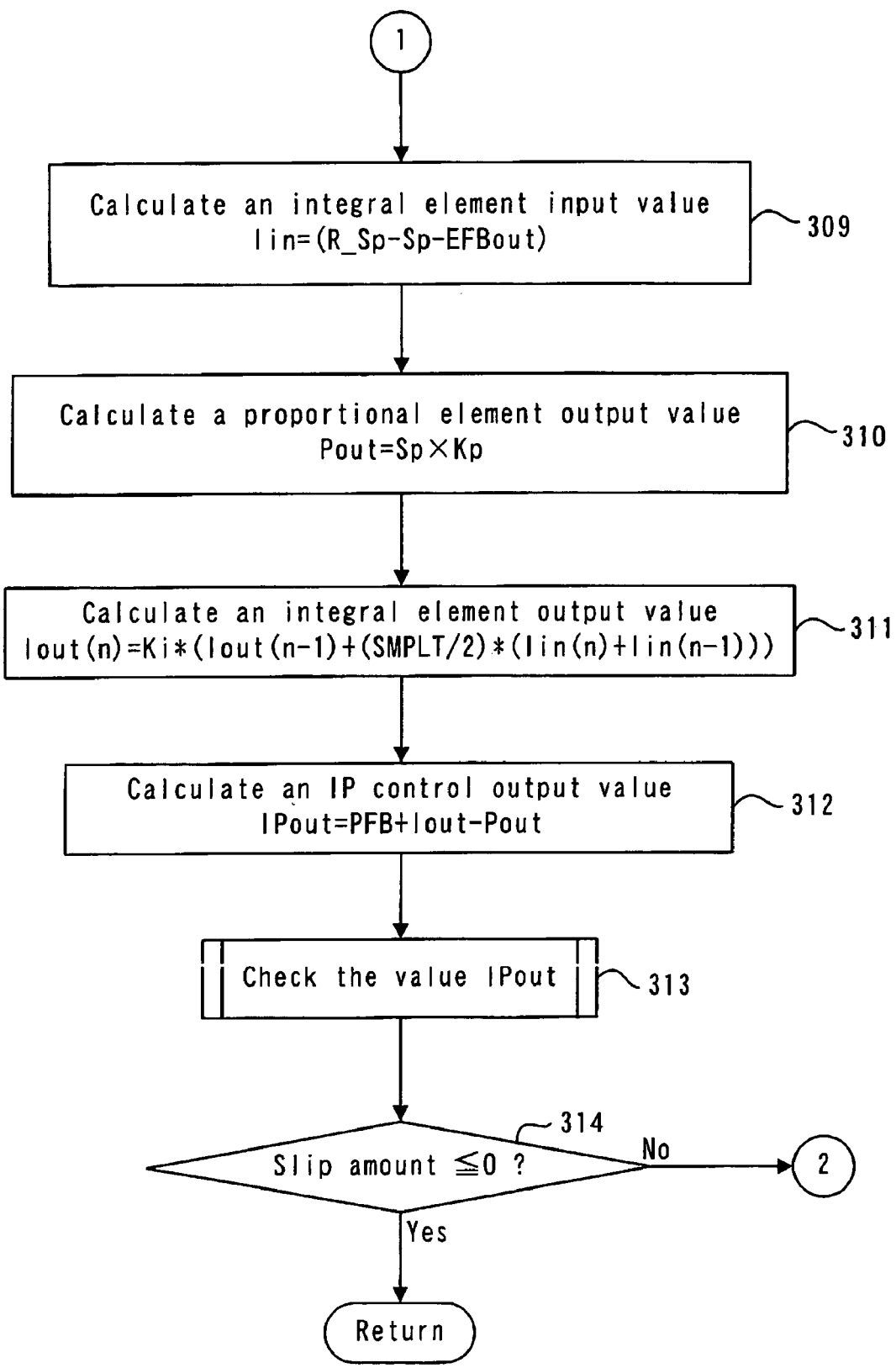
FIG. 15 is a flowchart for explaining consecutive process of the sub-routine illustrated in FIG. 14.

The CPU then proceeds to step 309 illustrated in FIG. 15 for calculating an input value Iin of the integral element in accordance with the following formula:

$$Iin=R\_Sp-Sp-EBout.$$

The CPU then proceeds to step 310 for calculating an output value Pout from the proportional element in accordance with the following formula:

$$Pout=Sp \times Kp.$$

The CPU then proceeds to step 311 for calculating an output value Iout from the integral element in accordance with the following formula. The element "SMLT" in the formula represents a sampling time.

$$Iout(n)=Ki \cdot (Iout(n-1)+(SMPLT/2) \cdot (Iin(n)+Iin\ (n-1))).$$

The CPU then proceeds to step 312 for calculating an IP control output value IPout which represents the disengagement indicating pressure in accordance with the following formula:

$$IPout=PFB+Iout-Pout.$$

The CPU then proceeds to step 313 for controlling the disengagement indicating pressure (IPout) within a range of a predetermined bound pair. The CPU then proceeds to step 314 for judging whether or not the slip has disappeared. The judgment can be performed based upon the actual current slip amount Sp which has calculated at step 306. When the actual current slip amount Sp is substantially equal to or less than zero value, the CPU judges that the slip has disappeared. At this stage, the hydraulic pressure being supplied to the on-coming friction engagement element has been still small immediately after the commencement of the slip. That is, the on-coming friction engagement element has not been transmitted sufficient torque yet. Therefore, the current slip amount Sp is judged to be greater than zero value. A negative judgment (NO) is obtained at step 314 and the CPU returns to step 305 after the time pass, for example the time pass of 5 milliseconds. The CPU repeatedly performs steps 305 to 313 until the current slip amount Sp becomes substantially equal to or less than zero value.

In accordance with the slip FB control performed as described above, the slip amount Sp is smoothly increased so as to be approximated to the desired value outputted from the reference model M(s). Therefore, the output torque of the automatic transmission 30 can be effectively restrained from fluctuating such that the shift feeling can be effectively enhanced.

Figure 16:
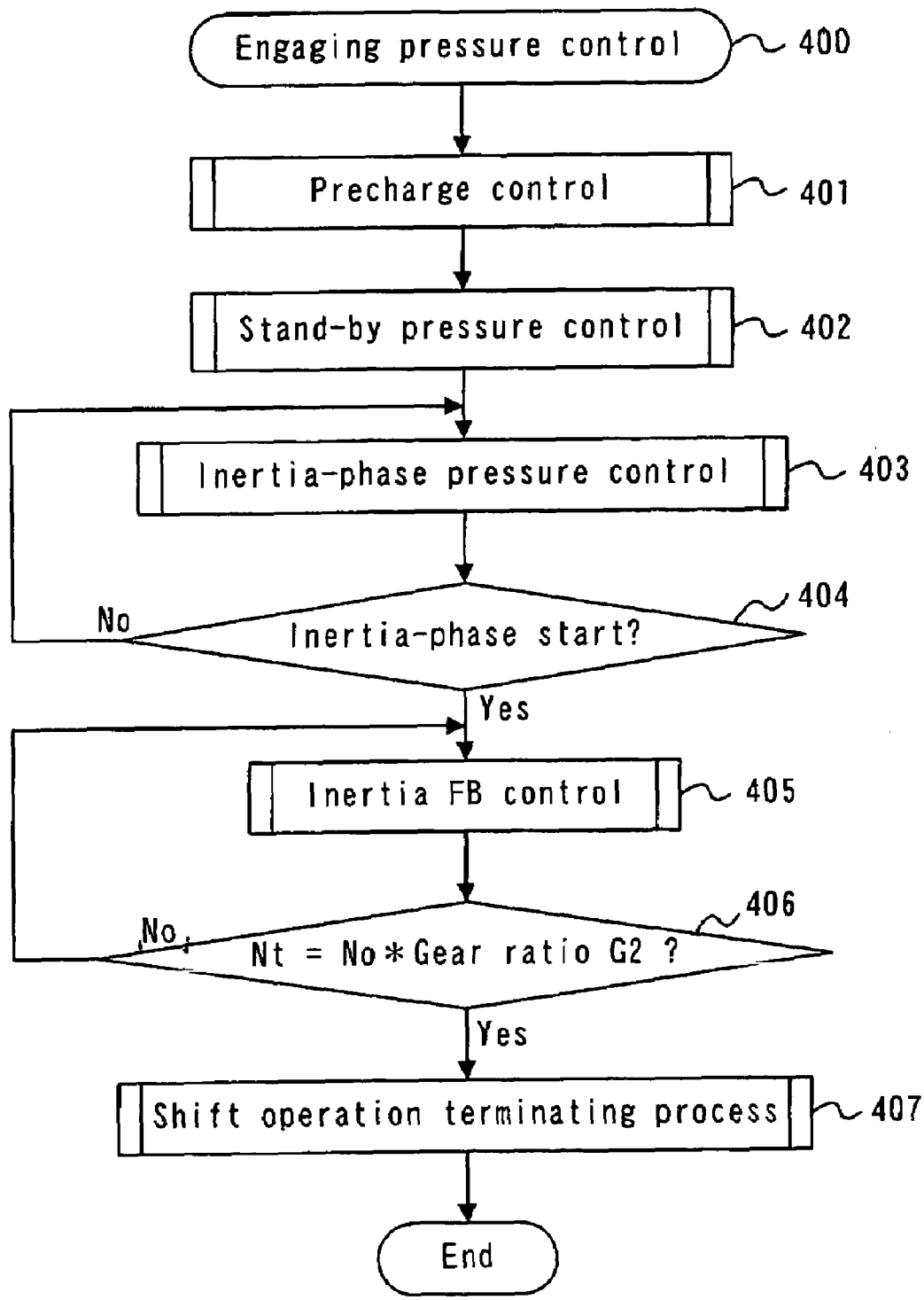
FIG. 16 is a flowchart for explaining an engaging pressure control routine performed by the CPU.

Next, with reference to the flowchart illustrated in FIG. 16, the following description will be given for explaining an engaging pressure control routine performed by the CPU of the electric control unit 50. This routine commences in response to the shifting operation start command signal for up-shifting from the second shift stage to the third shift stage. Based upon this control timing, the CPU starts this routine from step 400 (i.e. an engaging side controlling means) and proceeds to step 401 for starting the pre-charge control for rapidly increasing the engaging pressure. The CPU then proceeds to step 402 for performing the stand-by pressure control immediately after termination of the pre-charge control and prior to commencement of the slip FB control. In the stand-by pressure control, the engaging pressure is increased to the pressure (the stand-by pressure) immediately before the torque transmitting to the on-coming friction engagement element.

Further, in response to the commencement of the slip FB control, the CPU proceeds to step 403 for performing the inertia-phase pressure control. In the inertia-phase pressure control, the engaging pressure for the on-coming friction engagement element is gradually increased up to the level of the pressure required for shifting from the torque phase to the inertia phase, as time goes on based upon the control command value for the on-coming friction engagement element. Therefore, the torque being transmitted to the on-coming friction engagement element is increased.

The CPU then proceeds to step 404 for judging whether or not the transmission 30 has shifted to the inertia phase. When a negative judgment (NO) is obtained at step 404, the CPU returns to step 403 for performing the inertia-phase pressure control again. In consequence, the on-coming friction engagement element is transmitted with the torque as time goes on such that the slip amount can start decreasing.

In the meantime, the slip amount Sp is controlled to be maintained at the predetermined target value r2 by the disengaging pressure control. Therefore, the CPU decreases the disengaging pressure for increasing the slip amount Sp while the slip amount starts decreasing in response to the torque transmitting to the on-coming friction engagement element.

In accordance with the repeatedly performed processes described above, the slip amount Sp disappears at step 314. In this case, the CPU terminates the slip FB control and proceeds to step 203 of the disengaging pressure control routine illustrated in FIG. 13. At step 203, the CPU performs a ramp control for completely draining the disengaging pressure being supplied to the off-going friction engagement element. At step 204, the CPU performs a process for terminating the shifting operation at the disengagement side and terminates the disengaging pressure control routine.

Further, when the CPU judges at step 404 that the transmission has shifted to the inertia phase, an affirmative judgment (YES) is obtained at step 404. Therefore, the CPU proceeds to step 405 for performing a known inertia FB control. The CPU then proceeds to step 406 for judging whether or not the turbine rotational speed Nt substantially corresponds to a value obtained by multiplying the output rotational speed No by a gear ratio G2 for the third shift stage. When the turbine rotational speed Nt does not correspond to the value, a negative judgment (NO) is obtained at step 406 the CPU returns to step 405. By repeatedly returning to step 405 from step 406, the turbine rotational speed Nt corresponds to the value obtained by multiplying the output rotational speed No by the gear ratio G2. In this case, the CPU then proceeds to step 407 for performing a process for terminating the shift operation at the engagement side.

As described above, the clutch-to-clutch shift operation from the second shift stage to the third shift stage is completed according to the first embodiment of the present invention. Alternatively, the present invention can be applicable for the shift operation between some other shift stages.

Figure 17:
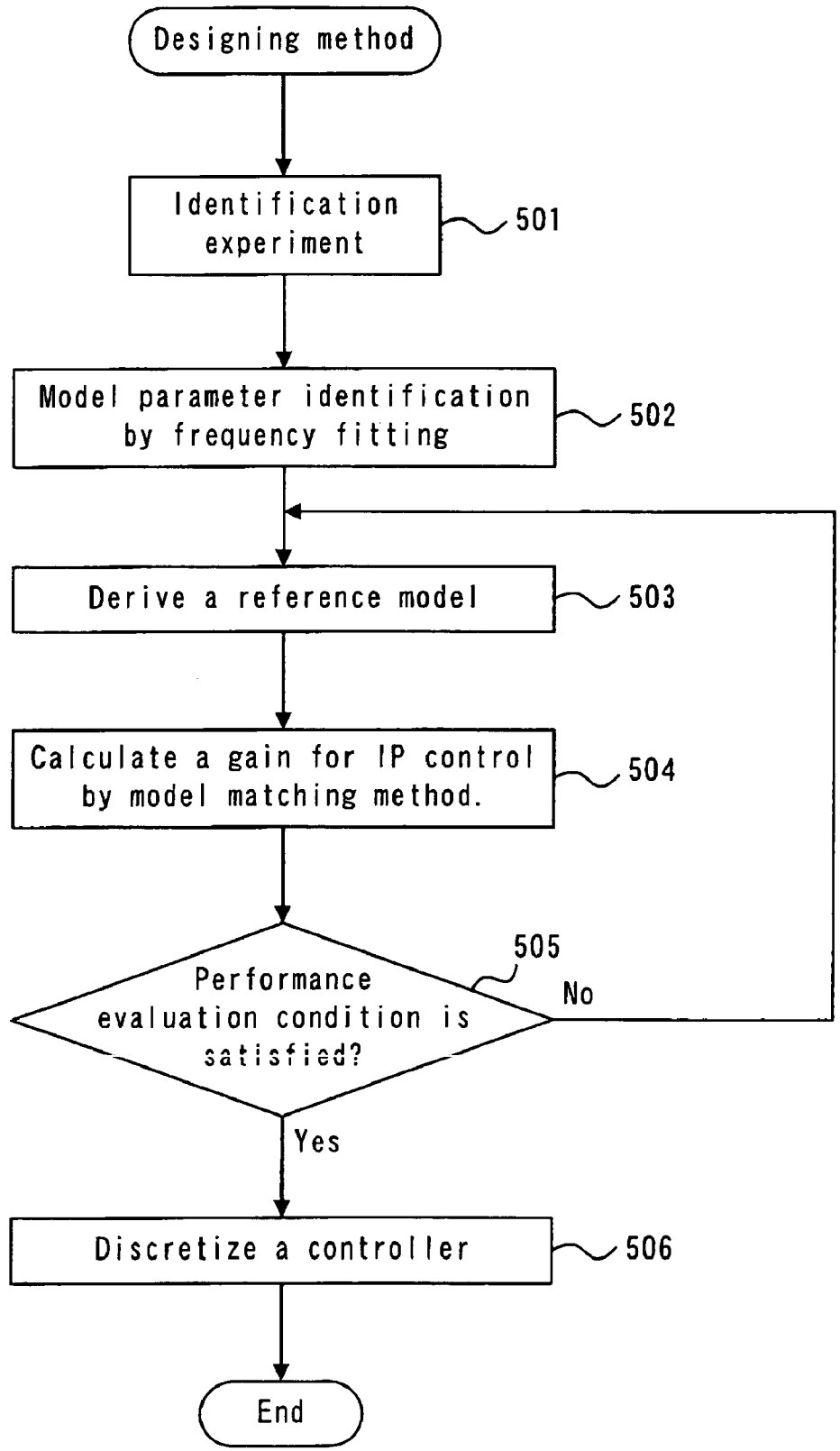
FIG. 17 is a flowchart for explaining details of a method of designing an integral gain and a proportional gain.

Next, the following description will be given for explaining a method of designing each gain (Ki, Kp) for use of the integral-proportional control of the slip FB control. Each gain (Ki, KP) can be derived by fitting a transfer function of an actual data within a frequency domain with a transfer function (i.e. the controlled object P(s)) from the engaging pressure to the slip amount. Meanwhile, the reference model M(S) is constructed in light of a time needed for the slip amount to reach a target value or a time needed for shifting in the transmission 30 such that the shift feeling can be enhanced. Each gain (Ki, Kp) is defined by use of a model matching method and the transfer function is discretized and is mounted in the microcomputer. In the model matching method with a use of a closed loop for applying the integral-proportional control to the controlled object P(s), each gain (Ki, Kp) can be defined so as to correspond or approximate response characteristics of the slip amount from the closed loop to the desired value output from the reference model M(s). The description below will be given for explaining the method of defining each gain (Ki, Kp) with a reference to a flowchart illustrated in FIG. 17.

The CPU starts the routine from step 501 for performing an identification experiment, i.e. for experimentally majoring the actual response characteristics from the engaging pressure to the slip amount by mounting the transmission 30 on the vehicle. At step 502, the CPU performs a model parameter identification, i.e. computes a coefficient of a frequency transfer function, wherein a transfer function of the response characteristics is determined.

At step 503, the CPU derives the reference model M(s) so as to enhance the shift feeling to the best or around. At step 504, the CPU computes each gain (Ki, Kp) for use of the integral-proportional control by the model matching method. Each gain (Ki, KP) is determined so as to substantially correspond the slip amount with the desired value output from the reference model.

At step 505, the CPU judges whether or not a performance evaluation condition has been satisfied. When the performance evaluation condition has not been satisfied, a negative judgment (NO) is obtained at step 505 and the CPU returns to step 503 so as to reconstruct the reference model M(s). The processes from step 503 to step 505 are repeatedly performed so as to satisfy the performance evaluation condition at step 505. When the performance evaluation condition has been satisfied, an affirmative judgment (YES) is obtained at step 505 and the CPU proceeds to step 506 for discretizing the controller. That is, each gain (Ki, Kp) is continuously designed, as an analog value. Each gain is further converted from the analog value to a digital value so as to be mounted to the microcomputer. The transfer function with the discrete digital value representing each gain (Ki, Kp) is mounted to the microcomputer.

The transfer function from the disengaging pressure to the slip amount of the slip FB control widely varies depending on whether the L/U clutch 22a has been engaged or disengaged, or whether or not the transmission has slipped therein. Therefore, according to the first embodiment of the present invention, each gain (Ki, Kp) is designed not only at the time of shifting but also in response to the disengaged/engaged condition of the L/U clutch 22a.

Figure 18:
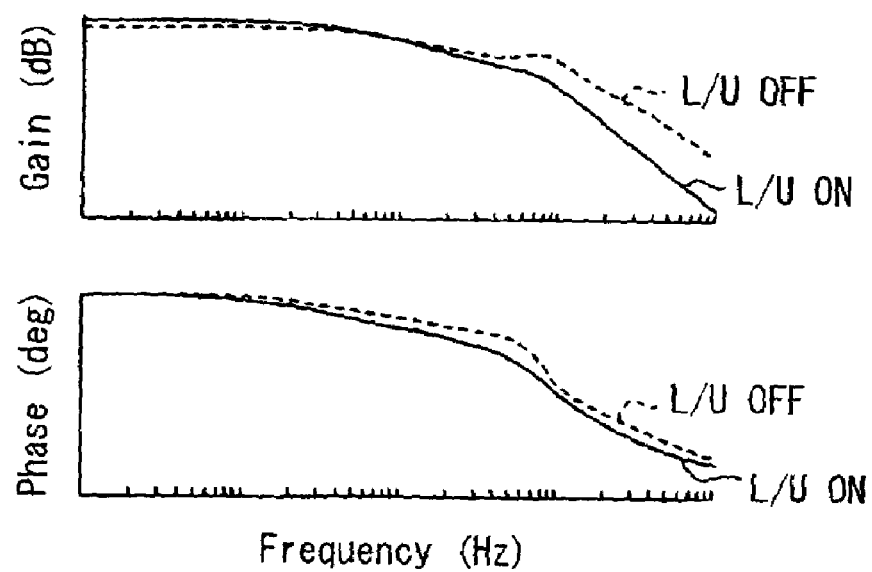
FIG. 18 is a graph illustrating frequency characteristics of a controlled object during a L/U clutch being engaged and disengaged.

As illustrated in FIG. 18, while the L/U clutch 22a is under the engaged condition, the controlled object appears to have frequency characteristic with a relatively high gain comparing with the controlled object while the L/U clutch 22a is under the disengaged condition. Therefore, when the slip FB control is performed for the off-going friction engagement element during the disengagement of the L/U clutch 22a by use of the control gains (Ki, Kp) appropriately designed for the controlled object during the engagement thereof, the control gains (Ki, Kp) will be too high for the controlled object during the disengagement of the L/U clutch 22a such that the slip amount may vibrate and diverge and the, shift feeling may deteriorate.

Figure 19A:
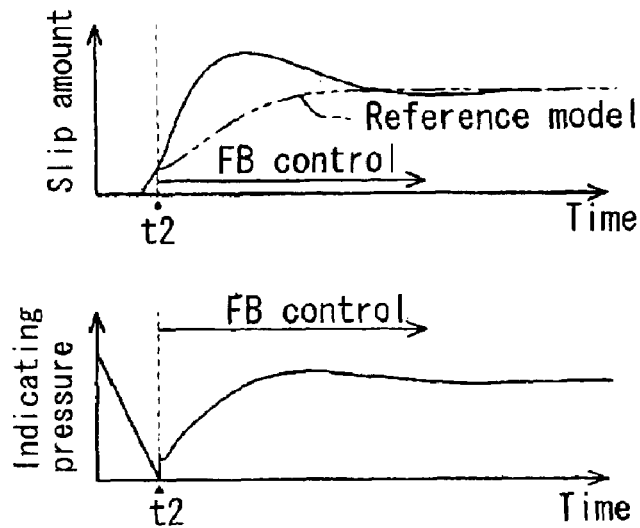
FIG. 19(a) is a graph illustrating response characteristics of the slip amount when the gain designed under the L/U clutch being disengaged is used for performing the slip FB control during the L/U clutch being actually engaged.
Figure 19B:
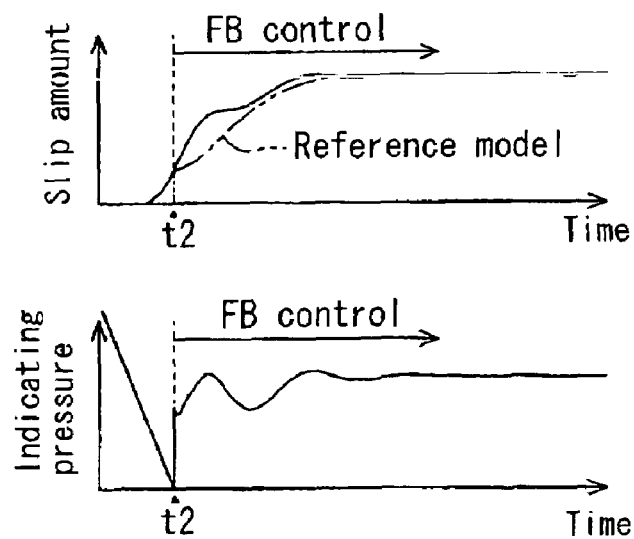
FIG. 19(b) is a graph illustrating response characteristics of the slip amount when the gain designed under the L/U clutch being engaged is used for performing the slip FB control during the L/U clutch being actually engaged.

On the other hand, as illustrated in FIG. 19(*a*), when the slip FB control is performed for the off-going friction engagement element during the engagement of the L/U clutch 22a by use of the control gains (Ki, Kp) appropriately designed for the controlled object during the disengagement thereof, the control gains (Ki, Kp) will become too low for the controlled object during the engagement thereof such that the slip amount may be corrected after overshooting. Therefore, the rotational speed of the crankshaft is increased, thereby causing backlash of the output torque.

In light of foregoing, the condition of the L/U clutch 22a is comprehended prior to performing of the slip FB control. The gains used for the slip FB control of the off-going friction engagement element are switched depending on the condition of the L/U clutch 22a. Therefore, the slip FB control can be appropriately performed regardless of the condition of the L/U clutch 22a. As illustrated in FIG. 19(*b*), the overshooting of the slip amount, i.e. the turbine racing can be effectively restrained.

As described above, following effects for example can be obtained according to the first embodiment of the present invention.

(1) The slip FB control is performed when the CPU judges that the filtered slip amount SP_flt has exceeded the predetermined threshold value r1. The engaging pressure is increasingly supplied to the on-coming friction engagement element depending on the commencement of the slip FB control. The torque to be supplied to the on-coming friction engagement element is hence increased. In the meantime, the slip amount Sp of the off-going friction engagement element is controlled so as to follow the target slip amount R_Sp (the target slip value r2). The slip amount then reaches zero value as time goes on. As described above, the output torque can be controlled so as to enhance the shifting feeling under the favor of the slip FB control for controlling the slip amount Sp along with the ideal transit trace for restraining the shift shock. According to the first embodiment of the present invention, the slip FB control is also performed while the slip amount Sp has shifted from the predetermined threshold value r1 to the predetermined target value r2. Therefore, the slip amount can be stably changed, thereby leading to enhance the shift feeling.

(2) The CPU judges whether or not the slip has started based upon the filtered slip amount Sp_flt that is computed by eliminating vibrations such as sensor noise and disturbances on the road from the slip amount Sp. Therefore, the slip misjudgment can be effectively prevented from occurrence.

The slip FB control is performed by use of the slip amount computed based upon the filtered output rotational speed No_flt which is generated by eliminating the drive system vibrations from the output rotational speed No. Therefore, the slip FB control can be effectively performed without being much affected by the drive system vibrations.

As described above, the slip FB control can be performed appropriately for each shift control phase, such as a phase prior to the slip FB control and a phase after the slip FB control, by switching a method of calculating the slip amount in response to each shift control phase.

(3) The slip FB control is performed by setting the control gain being different corresponding to the engaged/disengaged condition of the L/U clutch 22a. Therefore, the slip FB control can be appropriately performed in response to the condition of the LIU clutch 22a.

(4) According to the error FB control, the slip amount can be controlled to possess improved tracking performance to the target slip amount even when the slip amount is affected by the disturbances such as the individual difference of the microcomputer according to mass-production, fluctuation of the feature of the operating fluid due to temperature change, and aging distortion including wear of the friction engagement elements and deterioration of the operating fluid. Therefore, the output torque can be effectively restrained from fluctuation.

(5) The proportional and integral gains for the integral-proportional controller are adjusted so, as to correspond or approximate the response characteristics of the slip amount from the closed loop for the IP control to the desired value outputted from the reference model M(s). Therefore, a desired IP controller can be designed for a short time compared with a method of adjusting the proportional and integral gains at random.

Next, the following description will be given for explaining a second embodiment of the present invention with reference to FIGS. 20 and 21.

According to the second embodiment, a control problem is applied to the slip FB control. The same portion of the slip FB control to the one according to the first embodiment will not be described hereinafter for simplifying the description. According to the first embodiment, each gain for the integral-proportional control is derived by the model matching method with an understanding of the characteristics of the automatic transmission 30 (i.e. the controlled object) within the frequency domain such that the ideal slip response is obtained. However, according to the second embodiment, each gain for the integral-proportional control is computed as described below.

Figure 20:
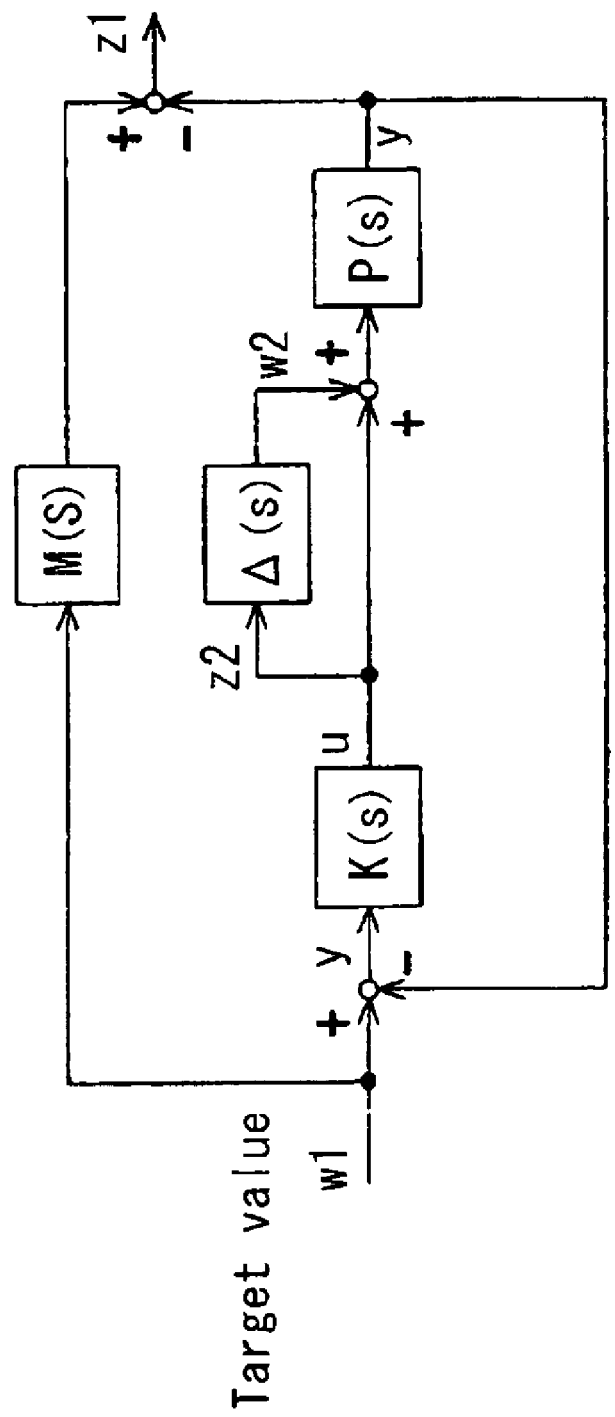
FIG. 20 is a block diagram for designing a controller for H control according to a second embodiment of the present invention.

As illustrated in FIG. 20, a closed loop is defined with a controller K(s) relative to the controlled object P(s). In order to obtain a desired response from the closed loop, the controller K(s) is designed by adjusting an weight function such that a transfer function from a target value (the slip amount) w1 to an actual slip amount (an observation amount) y becomes substantially equivalent to the reference model M(s). Therefore, the tracking performance of the slip amount to the target slip amount can be improved. That is, the problem for obtaining the controller K(s) for approximating the response of the controlled object P(s) to the response of the reference model M(s) resolves to the control problem regarding to the transfer function from the target value w1 to a control amount z1. The control amount z1 represents a deviation between the output from the reference model M(s) and the observation amount y. The controller K(s) is designed by adjusting the weight function so as to satisfy conditions of the norm, thereby enabling to assure the good tracking performance of the slip amount to the target slip amount.

Characteristic fluctuation of the controlled object is treated as a multiplicative fluctuation $\Delta(s)$. An input to the multiplicative fluctuation $\Delta(s)$ is a control amount z2 and an output from the multiplicative fluctuation $\Delta(s)$ is a perturbation input w2 (i.e. an input to a generalized plant). The controller K(s) is designed by adjusting a weight function for stabilizing a transfer function between the perturbation input w2 and the control amount z2. Therefore, the control amount z2 can be effectively prevented from being affected by the perturbation input w2. That is, the problem for obtaining the controller K(s) for restraining the affect by the characteristic fluctuation resolves to the control problem regarding to the transfer function from the perturbation input w2 to the control amount z2. Further, the controller K(s) is designed by adjusting the weight function for stabilizing the controlled object so as to satisfy the conditions of the norm.

Figure 21:
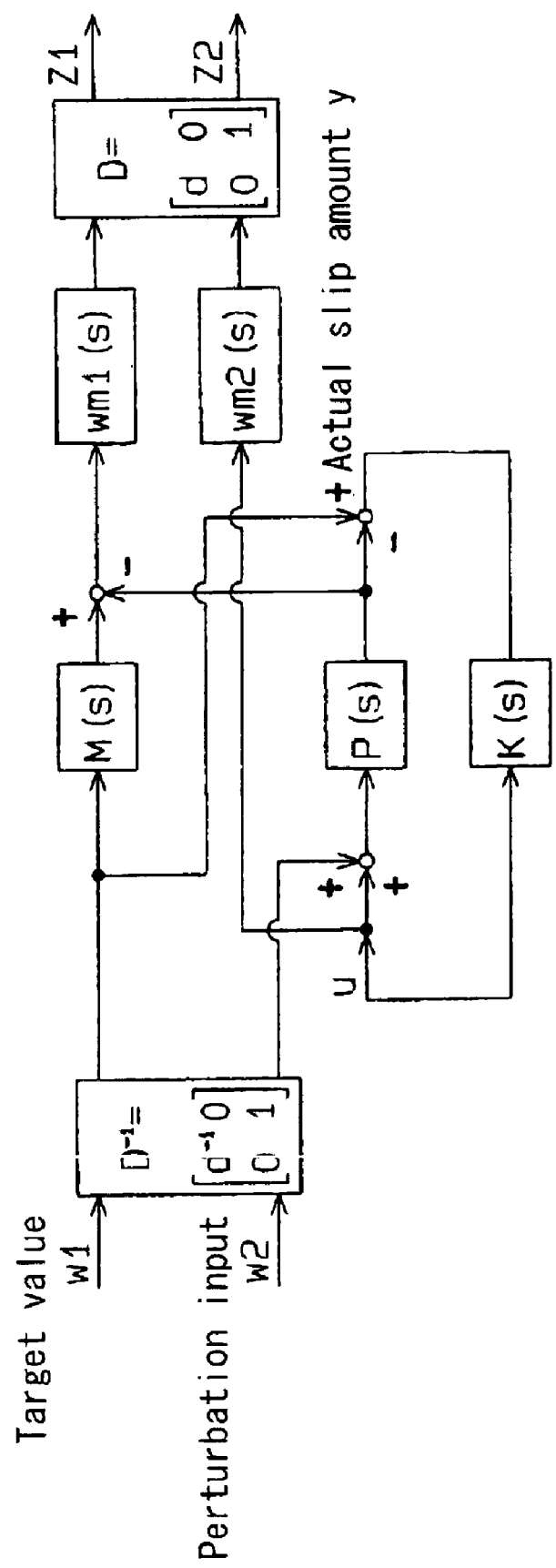
FIG. 21 is a block diagram of a generalized plant for the H control.
Figure 22:
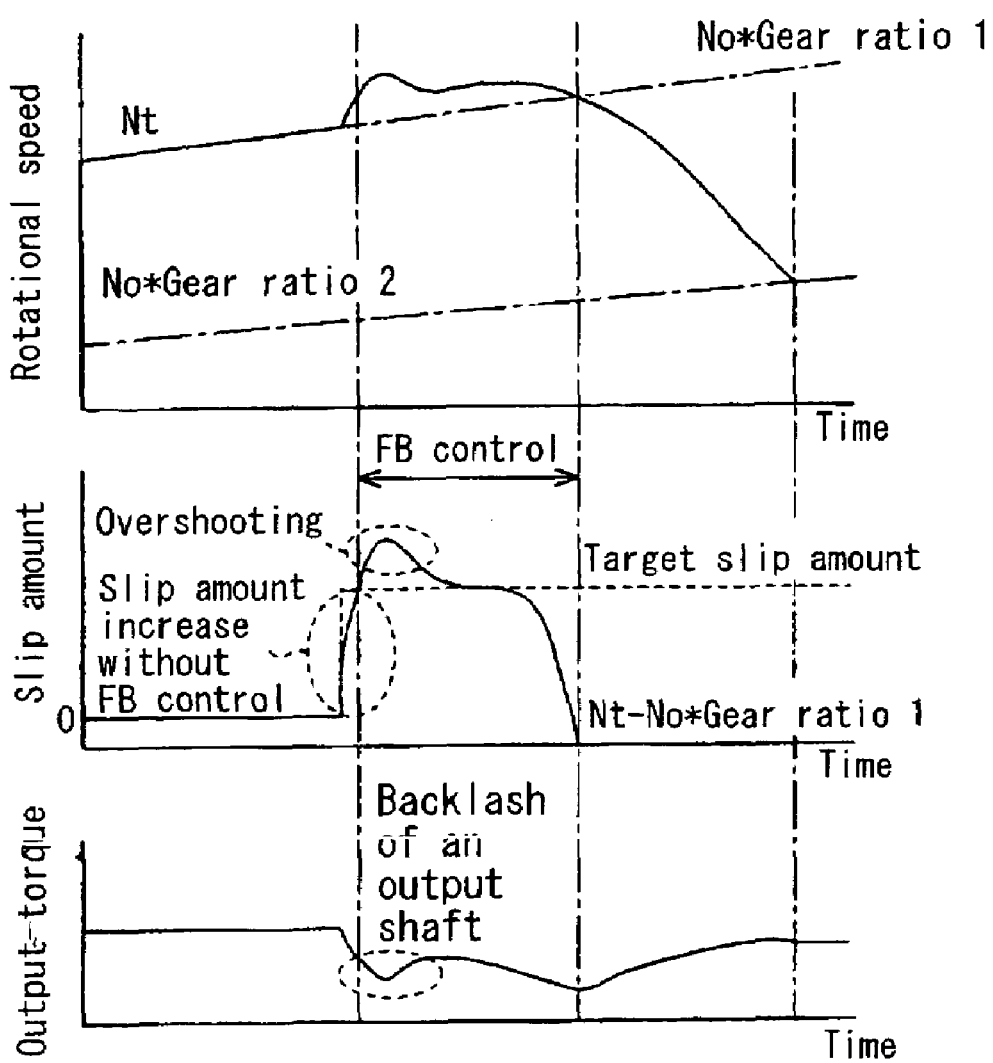
FIG. 22 is a time chart illustrating a conventional slip feedback control.

According to the second embodiment of the present invention, as illustrated in FIG. 21, the controller K(s) is designed resulting in the control problem with a constant Matrix Scaling D. More particularly, the controller K(s) is designed from the generalized plant having an exogenous input w(s) (i.e. an external input), a control input u(s), a control amount z(s), and an observation amount y(s). A weight function wm1(s) is designed for assuring the tracking performance of the controlled object and a weight function wm2(s) is designed for assuring a stability thereof. The controller K(s) can be designed by analyzing the known control problem relative to the generalized plant with a constant Matrix Scaling.

The designing of the control problem can be executed by adjusting the weight functions wm1(s) and wm2(s). The weight function wm2(s) is substantially uniquely determined in response to the characteristic fluctuation of the controlled object. In the meantime, the weight function wm1(s) possesses a degree of freedom for the designing. Therefore, the controller is designed by adjusting the weight function wm1(s) so as to prevent the gain characteristics of the transfer function from the target slip amount w1 to the actual slip amount y (the control amount z1) from fluctuating within a low frequency region.

Next, a model reduction transaction is applied to the controller K(s) designed as described above without changing the characteristics of the controller, each gain for the integral-proportional control is derived, and the controller K(s) is then mounted in the microcomputer. Alternatively, the model reduction transaction is applied to the controller K(s) designed as described above without changing the characteristics of the controller, and the controller K(s) can be then mounted in the microcomputer.

As described aboved, the same effects as the first embodiment can be obtained according to the second embodiment.

Further, the present invention is not limited only to the above first and second preferred embodiments and the following modifications can be applicable.

According to the first embodiment, the slip amount Sp is calculated based upon the turbine rotational speed Nt. Alternatively, the slip amount can be calculated by use of a filtered turbine rotational speed Nt so as to attenuate or eliminate sensor noise. In this case, the slip FB control can be effectively restrained from being affected by the sensor noise.

According to the second embodiment, the actual slip amount y can be computed by respectively filtering the turbine rotational speed Nt and the output rotational speed No both of which are referred to at the time of calculation.

The system structure according to each embodiment described above is just an example such that other system structure can be employed.

The principles, preferred embodiments and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by other, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A control apparatus for controlling a torque phase of an up-shifting operation in an automatic transmission having a torque converter, an input shaft of the automatic transmission connected to a turbine runner in the torque converter, an output shaft of the automatic transmission, and plural friction engagement elements selectively engaged or disengaged to connect or disconnect the input shaft with the output shaft indirectly for establishing plural shaft stages, wherein when up-shifting from one shift stage of the plural shift stages to another shift stage an off-going friction engagement element of the plural friction engagement elements is switched from an engaged condition to a disengaged condition for reducing torque transmitted by decreasing a hydraulic pressure supplied such that the off-going friction element starts to slip, and an on-coming friction engagement element of the plural friction engagement elements is switched from a disengaged condition to an engaged condition for multiplying transmitted torque by increasing supplied hydraulic pressure such that the on-going friction element stops slipping, the control apparatus comprising:

a slip amount calculating means for calculating a slip amount based upon a rotational speed of the input shaft and a rotational speed of the output shaft thereof;

a judging means for judging whether or not the calculated slip amount is greater than a predetermined threshold value by comparison;

a target slip amount calculating means for calculating a target slip amount, the target slip amount varied from the predetermined threshold value to a predetermined target value drawing an ideal trace for restraining a shift shock of the torque phase of the up-shifting operation;

a disengaging side controlling means for starting to perform an integral-proportional feedback control so as to substantially match the calculated slip amount with the calculated target slip amount for restraining over rotation of the turbine runner due to the up-shifting operation when the calculated slip amount is judged to be in excess of the predetermined threshold value by the judging means; and an engaging side controlling means for increasing the torque to be transmitted to the on-coming friction engagement element in association with commencement of the integral-proportional feedback control.

2. A control apparatus for controlling a torque phase of an up-shifting operation in an automatic transmission according to claim 1, wherein the slip amount to be compared with the predetermined threshold value by the judging means corresponds to a slip amount applied with a first filtering process for eliminating a first predetermined frequency component from the slip amount, and the slip amount controlled to be substantially matched with the target slip amount by the disengaging side controlling means corresponds to a slip amount calculated based upon the input shaft rotational speed and the output shaft rotational speed applied with a third filtering process for eliminating a third predetermined frequency component from the output shaft rotational speed.

3. A control apparatus for controlling a torque phase of an up-shifting operation in an automatic transmission according to claim 2, wherein the slip amount controlled to be substantially matched with the target slip amount by the disengaging side controlling means corresponds to a slip amount calculated based upon the input shaft rotational speed applied with a second filtering process for eliminating a second predetermined frequency component from the input shaft rotational speed.

4. A control apparatus for controlling a torque phase of an up-shifting operation in an automatic transmission according to claim 1 further comprising:

a lock-up clutch capable of connecting the input shaft of the automatic transmission and the output shaft thereof, wherein the disengaging side controlling means sets a control gain for the integral-proportional feedback control at different values depending on an engaged/disengaged condition of the lock-up clutch.

5. A control apparatus for controlling a torque phase of an up-shifting operation in an automatic transmission according to claim 1 further comprising, a reference model included in the target slip amount calculating means and capable of outputting the target slip amount when the reference model is inputted with a value variable in a stair step manner from the predetermined threshold value to the predetermined target value, and an error feedback controlling means for feedbacking an error between the slip amount calculated by the slip amount calculating means and the target slip amount outputted from the reference model.

6. A control apparatus for controlling a torque phase of up-shifting operation in an automatic transmission according to claim 1, wherein the target slip amount increases from the predetermined threshold value to the predetermined target value in dependence on time elapse.

7. A control apparatus for controlling a torque phase of an up-shifting operation in an automatic transmission having plural friction engagement elements selectively engaged or disengaged to connect or disconnect an input shaft of the automatic transmission with an output shaft of the automatic transmission indirectly for establishing plural shift stages along with control of an oil pressure to be supplied thereto, wherein an off-going friction engagement element of the plural friction engagement elements is switched from an engaged condition to a disengaged condition by reducing torque transmitted to the off-going friction engagement element in response to reduction of the oil pressure supplied to the off-going friction engagement element when up-shifting from a shift stage of the plural shift stages to another shift stage thereof such that the off-going friction engagement element slips, and an on-coming friction engagement element of the plural friction engagement elements is switched from a disengaged condition to an engaged condition by increasing torque to be transmitted to the on-coming friction engagement element in response to increase of the oil pressure to be supplied to the on-coming friction engagement element at the time of shifting, the control apparatus comprising:

a slip amount calculating means for calculating a slip amount based upon a rotational speed of the input shaft and a rotational speed of an output shaft thereof;

a judging means for judging whether or not the calculated slip amount is greater than a predetermined threshold value by comparison;

a target slip amount calculating means for calculating a target slip amount, the target slip amount varied from the predetermined threshold value to a predetermined target value drawing an ideal trace for restraining a shift shock of the torque phase of the up-shifting operation;

a disengaging side controlling means for starting to perform an integral-proportional feedback control so as to substantially match the calculated slip amount with the calculated target slip amount for preventing an over rotation of the input shaft due to the up-shifting operation when the calculated slip amount is judged to be in excess of the predetermined threshold value by the judging means; and an engaging side controlling means for increasing the torque to be transmitted to the on-coming friction engagement element in association with commencement of the integral-proportional feedback control.

8. A control apparatus for controlling a torque phase of an up-shifting operation in an automatic transmission according to claim 7, wherein the engaging side controlling means increases the oil pressure supplied to the on-coming friction engagement element to a level of a stand-by pressure which does not generate the torque at the time of shifting, maintains the oil pressure being supplied to the on-coming friction engagement element at the stand-by pressure level until commencement of the integral-proportional feedback control, and increases the oil pressure being supplied to the on-coming friction engagement element to a level of an oil pressure required for shifting to an inertia phase after the commencement of the integral-proportional feedback control.

9. A control apparatus for controlling a torque phase of an up-shifting operation in an automatic transmission according to claim 7, wherein the slip amount to be compared with the predetermined threshold value by the judging means corresponds to a slip amount applied with a first filtering process for eliminating a first predetermined frequency component from the slip amount, and the slip amount controlled to be substantially matched with the target slip amount by the disengaging side controlling means corresponds to a slip amount calculated based upon the input shaft rotational speed and the output shaft rotational speed applied with a third filtering process for eliminating a third predetermined frequency component from the output shaft rotational speed.

10. A control apparatus for controlling a torque phase of an up-shifting operation in an automatic transmission according to claim 9, wherein the slip amount controlled to be substantially matched with the target slip amount by the disengaging side controlling means corresponds to a slip amount calculated based upon the input shaft rotational speed applied with a second filtering process for eliminating a second predetermined frequency component from the input shaft rotational speed.

11. A control apparatus for controlling a torque phase of an up-shifting operation in an automatic transmission according to claim 7 further comprising:
 a lock-up clutch capable of connecting the input shaft of the automatic transmission and the output shaft thereof, wherein the disengaging side controlling means sets a control gain for the integral-proportional feedback control at different values depending on an engaged/disengaged condition of the lock-up clutch.

12. A control apparatus for controlling a torque phase of an up-shifting operation in an automatic transmission according to claim 7 further comprising,
 a reference model included in the target slip amount calculating means and capable of outputting the target slip amount when the reference model is inputted with a value variable in a stair step manner from the predetermined threshold value to the predetermined target value, and
 an error feedback controlling means for feedbacking an error between the slip amount calculated by the slip amount calculating means and the target slip amount outputted from the reference model.

13. A control apparatus for controlling a torque phase of up-shifting operation in an automatic transmission according to claim 7, wherein the target slip amount increases from the predetermined threshold value to the predetermined target value in dependence on time elapse.

* * * * *